US008547394B2

(12) United States Patent
Swic et al.

(10) Patent No.: US 8,547,394 B2
(45) Date of Patent: Oct. 1, 2013

(54) ARRANGING AND PROCESSING COLOR SUB-PIXELS

(75) Inventors: Jerzy Wieslaw Swic, Vancouver (CA); Jiliang Song, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 431 days.

(21) Appl. No.: 12/907,189

(22) Filed: Oct. 19, 2010

(65) Prior Publication Data

US 2011/0285714 A1 Nov. 24, 2011

Related U.S. Application Data

(60) Provisional application No. 61/347,263, filed on May 21, 2010.

(51) Int. Cl.
*G09G 5/02* (2006.01)

(52) U.S. Cl.
USPC ........... 345/605; 345/589; 345/596; 345/597; 345/600; 345/694; 345/55; 382/260; 382/263

(58) Field of Classification Search
None
See application file for complete search history.

(56) References Cited

U.S. PATENT DOCUMENTS 6,100,872 A * 8/2000 Aratani et al. ................ 345/589
7,583,279 B2 * 9/2009 Brown Elliott et al. ...... 345/694

* cited by examiner

*Primary Examiner* — Antonio A Caschera

(57) ABSTRACT

An electro-optic display device includes a display matrix of display pixels. Each display pixel may include two or more first sub-pixels and a second sub-pixel. Each first sub-pixel may have two or more display states and a color filter. The second sub-pixel may have two or more display states and a white filter. The first sub-pixels may be arranged in rows and columns in a repeating pattern, and each first sub-pixel may be horizontally adjacent and vertically adjacent to one or more second sub-pixels. In addition, a display controller may include a data switch, a color correction module, an image filtering module, a color linearization module, an image dithering module, and a saturation adjustment module. The modules may be configured to perform operations at first and second pixel resolutions.

7 Claims, 19 Drawing Sheets

|  |  |  | P | $A_0$ | $A_1$ | $A_2$ | $A_3$ |
|---|---|---|---|---|---|---|---|
| $C_{20}$ | $C_{10}$ | $C_{00}$ | $B_0$ | $D_{00}$ | $D_{10}$ | $D_{20}$ |  |
| $C_{21}$ | $C_{11}$ | $C_{01}$ | $B_1$ | $D_{01}$ | $D_{11}$ | $D_{21}$ |  |

ARRANGING AND PROCESSING COLOR SUB-PIXELS

CROSS REFERENCE TO RELATED APPLICATIONS

The present application claims the benefit under 35 USC Section 119(e) of U.S. Provisional Patent Application Ser. No. 61/347,263, filed May 21, 2010. The present application is based on and claims priority from the provisional application, the disclosure of which is hereby expressly incorporated herein by reference in its entirety.

FIELD

The field of the present invention relates generally to digital image processing for display devices.

BACKGROUND

A digital image is comprised of a multitude of small picture elements or pixels. When a color digital image is rendered on a display device, a single pixel may be formed from red, green, and blue (RGB) sub-pixels. The sub-pixels in some RGB display devices may include either a red, green, or blue filter. The sub-pixels in a display device are spatially close and, for this reason, human vision perceives the red, green, and blue sub-pixels as a single-colored pixel. By modulating the colors of the individual sub-pixels, a range of colors can be generated for each pixel.

A color filter array (CFA) describes the arrangement of sub-pixels in color image sensors and in color display devices. A variety of CFAs are known. The Bayer CFA is one well-known example. Red, green, and blue sub-pixels are arranged in a square gird in the Bayer CFA. There are as many green sub-pixels as blue and red sub-pixels combined, with a green sub-pixel at every other position in both the horizontal and vertical directions, and the remaining positions being populated with blue and red sub-pixels. In the Bayer CFA, a single pixel includes two green and one each of blue and red sub-pixels.

Conventionally, the data for a color pixel define how much color each sub-pixel adds to the perceived color of the pixel. The data for each sub-pixel can vary within a range depending on the number of data bits allocated in the display system for sub-pixel values. For example, for 24-bit RGB color, 8 bits are allocated per sub-pixel, providing a range of 256 possible values for each color channel. If the data values for all components of an RGB pixel are zero, the pixel theoretically appears black. On the other hand, if all three sub-pixel values are at their maximum value, the pixel theoretically appears white. RGB pixel data expressed using 24-bits (8:8:8) provides for a color palette of 16,777,216 colors. Color pixel data, however, need not be expressed using 24-bits. RGB pixel data may be represented using as few as one bit per channel (1:1:1), providing a color palette of eight colors.

An electro-optic material has at least two "display states," the states differing in at least one optical property. An electro-optic material may be changed from one state to another by applying an electric field across the material. The optical property may or may not be perceptible to the human eye, and may include optical transmission, reflectance, or luminescence. For example, the optical property may be a perceptible color or shade of gray.

Electro-optic displays include the rotating bichromal member, electrochromic medium, electro-wetting, and particle-based electrophoretic types. Electrophoretic display devices ("EPD"), sometimes referred to as "electronic paper" devices, may employ one of several different types of electro-optic technologies. Particle-based electrophoretic media include a fluid, which may be either a liquid, or a gaseous fluid. Various types of particle-based EPD devices include those using encapsulated electrophoretic, polymer-dispersed electrophoretic, and microcellular media. Another electro-optic display type similar to EPDs is the dielectrophoretic display.

An electro-optic display device may have display pixels or sub-pixels that have multiple stable display states. Display devices in this category are capable of displaying (a) two or more display states, and (b) the display states are considered stable. The display pixels or sub-pixels of a bistable display may have first and second stable display states. The first and second display states differ in at least one optical property, such as a perceptible color or shade of gray. For example, in the first display state, the display pixel may appear black and in the second display state, the display pixel may appear white. The display pixels or sub-pixels of a display device having multiple stable display states may have three or more stable display states, each of the display states differing in at least one optical property, e.g., light, medium, and dark shades of a particular color. For example, the display pixels or sub-pixels may display states corresponding with 4, 8, 16, 32, or 64 different shades of gray.

With respect to capability (b), the display states may be considered to be stable, according to one definition, if the persistence of the display state with respect to display pixel drive time is sufficiently large. An exemplary electro-optic display pixel or sub-pixel may include a layer of electro-optic material situated between a common electrode and a pixel electrode. The display state of the display pixel or sub-pixel may be changed by driving a drive pulse (typically a voltage pulse) on one of the electrodes until the desired appearance is obtained. Alternatively, the display state of a display pixel or sub-pixel may be changed by driving a series of pulses on the electrode. In either case, the display pixel or sub-pixel exhibits a new display state at the conclusion of the drive time. If the new display state persists for at least several times the duration of the drive time, the new display state may be considered stable. Generally, in the art, the display states of display pixels of liquid crystal displays ("LCD") and CRTs are not considered to be stable, whereas electrophoretic displays, for example, are considered stable.

The level of reflectance of an electro-optic pixel or sub-pixel may be less than one hundred percent. Consequently, when a color image is rendered on an electro-optic display device, colors may tend to lack brightness. One technique for increasing brightness involves reducing the size of color filters associated with a display pixel. However, one problem with this technique is that it tends to reduce color saturation.

A digital image may be defined using more display states than an electro-optic display device may be capable of rendering. Thus, in order to render a digital image on an electro-optic display device, it may be necessary to reduce the bit-per-pixel resolution of the digital image. A color processing algorithm may pre-process a digital image before the image is to be rendered on an electro-optic display device. If the color processing algorithm processes the digital image in its native or original resolution, the algorithm may provide precision that will not be fully observable when the image is rendered on the electro-optic display device. Consequently, a color processing algorithm that only operates on image data in its native resolution may be wasteful of power and processing time.

SUMMARY

An embodiment is directed to an electro-optic display device having a display matrix of display pixels. Each display pixel may include two or more first sub-pixels and a second sub-pixel. Each first sub-pixel may have two or more display states and a color filter. The second sub-pixel may have two or more display states and a white filter. The first sub-pixels may be arranged in rows and columns in a repeating pattern, and each first sub-pixel may be horizontally adjacent and vertically adjacent to one or more second sub-pixels. In one embodiment, the display device is an electrophoretic display device.

An embodiment is directed to a method for preparing a color image for display on an electro-optic display device. The method may include: (a) receiving the color image defined by data pixels in a first pixel resolution, the first pixel resolution corresponding with each data pixel having a 5-bit red component, a 6-bit green component, and a 5-bit blue component; (b) performing a color correcting operation on the color image in the first pixel resolution; (c) performing an image sharpening operation on the color image in the first pixel resolution; (d) performing a color linearization operation on the color image in the first pixel resolution; (e) performing an image dithering operation on the color image in the first pixel resolution, the image dithering operation outputting the color image in a second pixel resolution, the second pixel resolution corresponding with each data pixel having a 4-bit red component, a 4-bit green component, and a 4-bit blue component; and (f) performing a saturation adjustment operation on the color image in one of the first and second pixel resolutions. In one embodiment, the operations (b), (c), (d), (e), and (f) are performed in the order: (b), (c), (d), (e), (f). In one embodiment, the operations (b), (c), (d), (e), and (f) are performed in the order: (b), (c), (e), (f), (d).

An embodiment is directed to a display controller. The display controller may include a data switch having an input to receive a color image defined by data pixels in a first pixel resolution, the first pixel resolution corresponding with each data pixel having a 5-bit red component, a 6-bit green component, and a 5-bit blue component. In addition, the display controller may include a color correction module to perform a color correcting operation on the color image in the first pixel resolution, an image filtering module to perform an image sharpening operation on the color image in the first pixel resolution, a color linearization module to perform a color linearization operation on the color image in the first pixel resolution, an image dithering module to perform an image dithering operation on the color image in the first pixel resolution, the image dithering operation outputting the color image in a second pixel resolution, the second pixel resolution corresponding with each data pixel having a 4-bit red component, a 4-bit green component, and a 4-bit blue component, and a saturation adjustment module to perform a saturation adjustment operation on the color image in one of the first and second pixel resolutions. In one embodiment, the display controller performs the operations (b), (c), (d), (e), and (f) in the order: (b), (c), (d), (e), (f). In one embodiment, the display controller performs the operations (b), (c), (d), (e), and (f) in the order: (b), (c), (e), (f), (d).

BRIEF DESCRIPTION OF THE DRAWINGS

FIG. 11 illustrates pixels in a portion of an exemplary image and sub-pixels in a portion of a display device.

FIG. 12 illustrates exemplary color filter arrays.

FIG. 13 illustrates a map for use in specifying neighbor pixels or sub-pixels to receive a quantization error of a sub-pixel.

FIG. 14 illustrates an exemplary use of the map of FIG. 13 for specifying neighbor pixels or sub-pixels to receive a quantization error of a sub-pixel.

FIG. 18 illustrates front views of two exemplary color filter arrays.

FIG. 23 illustrates front views of two color filter arrays.

DETAILED DESCRIPTION

Figure 1:
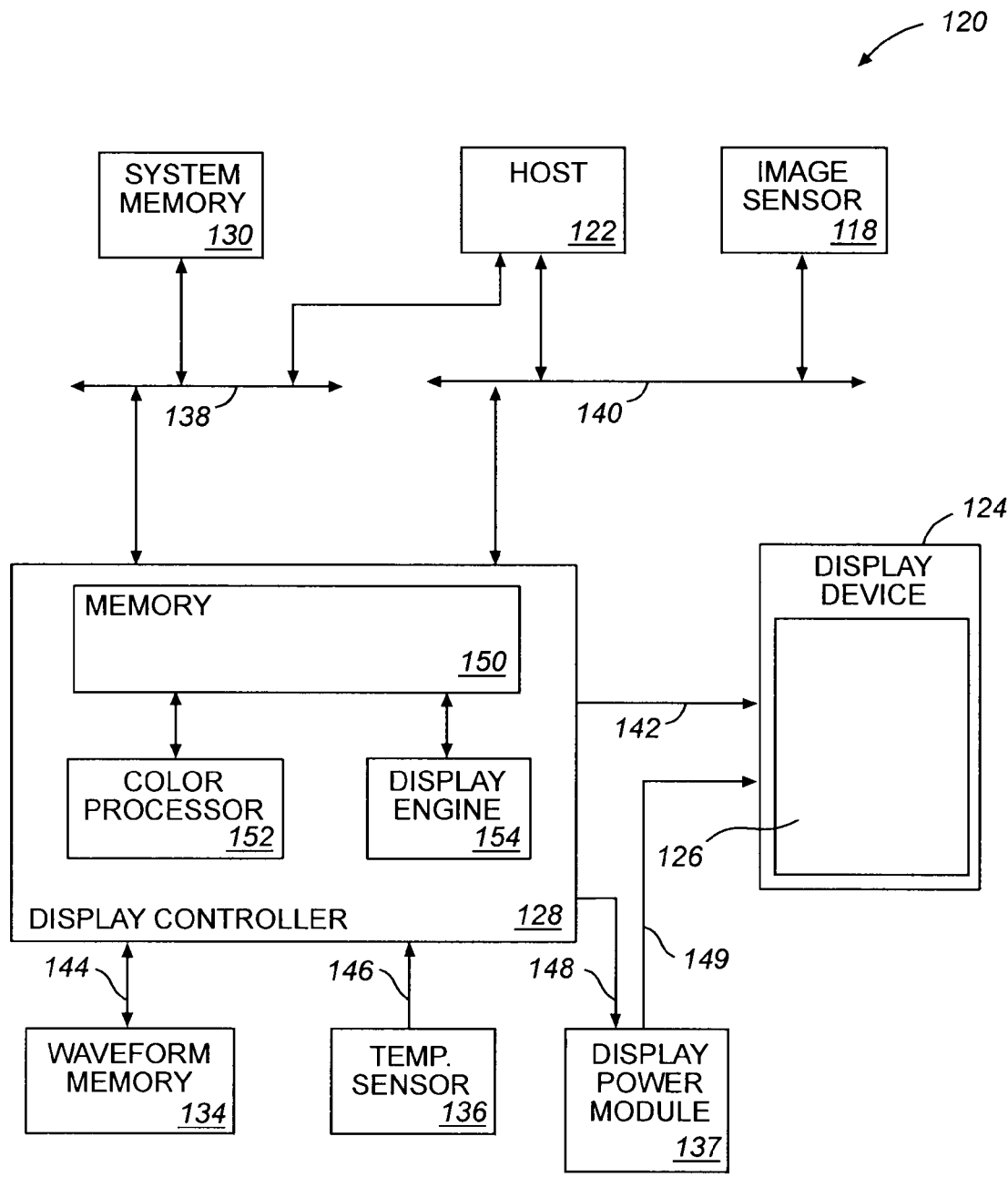
FIG. 1 is a simplified illustration of an exemplary system in which embodiments may be implemented.

This detailed description and the drawings illustrate exemplary embodiments. In the drawings, like referenced-numerals may identify like units, components, operations, or elements. In addition to the embodiments specifically described, other embodiments may be implemented and changes may be made to the described embodiments without departing from the spirit or scope of the subject matter presented herein. This detailed description and drawings are not to be taken in a limiting sense; the scopes of the inventions described herein are defined by the claims.

FIG. 1 illustrates a block diagram of an exemplary display system 120 illustrating one context in which embodiments may be implemented. The system 120 includes a host 122, a display device 124 having a display matrix 126, a display controller 128, and a system memory 130. In one embodiment, the system 120 may include an image sensor 118. The system 120 may also include a waveform memory 134, a temperature sensor 136, and a display power module 137. In addition, the system 120 may include buses 138, 140, 142, 144, 146, 148, and 149. In one embodiment, the display controller 128 includes a display controller memory 150, a color processor 152, a display engine 154, and other components (not shown). The system 120 may be any digital system or appliance. For example, the system 120 may be a battery powered (not shown) portable appliance, such as an electronic reader, cellular telephone, digital photo frame, or display sign. FIG. 1 shows only those aspects of the system 120 believed to be helpful for understanding the disclosed embodiments, numerous other aspects having been omitted.

The host 122 may be a general purpose microprocessor, digital signal processor, controller, computer, or any other type of device, circuit, or logic that executes instructions of any computer-readable type to perform operations. Any type of device that can function as a host or master is contemplated as being within the scope of the embodiments. The host 122 may be a "system-on-a-chip," having functional units for performing functions other than traditional host or processor functions. For example, the host 122 may include a transceiver or a display controller.

The system memory 130 may be may be an SRAM, VRAM, SGRAM, DDRDRAM, SDRAM, DRAM, flash, hard disk, or any other suitable volatile or non-volatile memory. The system memory may store instructions that the host 122 may read and execute to perform operations. The system memory may also store data.

The display device 124 may have display pixels that may be arranged in rows and columns forming a matrix ("display matrix") 126. A display pixel may be a single element or may include two or more sub-pixels. The display device 124 may be an electro-optic display device with display pixels having multiple stable display states in which individual display pixels may be driven from a current display state to a new display state by series of two or more drive pulses. In one alternative, the display device 124 may be an electro-optic display device with display pixels having multiple stable display states in which individual display pixels may be driven from a current display state to a new display state by a single drive pulse. The display device 124 may be an active-matrix display device. In one embodiment, the display device 124 may be an active-matrix, particle-based electrophoretic display device having display pixels that include one or more types of electrically-charged particles suspended in a fluid, the optical appearance of the display pixels being changeable by applying an electric field across the display pixel causing particle movement through the fluid. The display device 124 may be coupled with the display controller 128 via one or more buses 142, 149 that the display controller uses to provide pixel data and control signals to the display. The display device 124 may be a gray-scale display or a color display. In one embodiment, the display controller 128 may receive as input and provide as output either gray-scale or color images.

The display state of a display pixel is defined by one or more bits of data, which may be referred to as a "data pixel." An image is defined by data pixels and may be referred to as a "frame."

In embodiment, the display controller 128 may be disposed on an integrated circuit ("IC") separate from other elements of the system 120. In an alternative embodiment, the display controller 128 need not be embodied on a separate IC. In one embodiment, the display controller 128 may be integrated into one or more other elements of the system 120. For example, the display controller 128 may integrated with the host 122 on a singe IC.

The display memory 150 may be internal or external to the display controller 128, or may be divided with one or more components internal to the display controller, and one or more components external to the display controller. The display memory 150 may be an SRAM, VRAM, SGRAM, DDRDRAM, SDRAM, DRAM, flash, hard disk, or any other suitable volatile or non-volatile memory. The display memory 150 may store data or instructions.

The waveform memory 134 may be a flash memory, EPROM, EEPROM, or any other suitable non-volatile memory. The waveform memory 134 may store one or more different drive schemes, each drive scheme including one or more waveforms used for driving a display pixel to a new display state. The waveform memory 134 may include a different set of waveforms for one or more update modes. The waveform memory 134 may include waveforms suitable for use at one or more temperatures. The waveform memory 134 may be coupled with the display controller 128 via a serial or parallel bus.

In one embodiment, the waveform memory 134 may store data or instructions. The temperature sensor 136 may be provided to determine ambient temperature. The drive pulse (or more typically, the series of drive pulses) required to change the display state of a display pixel to a new display state may depend, in part, on temperature. The temperature sensor 136 may be mounted in any location suitable for obtaining temperature measurements that approximate the actual temperatures of the display pixels of the display device 124. The temperature sensor 136 may be coupled with the display controller 128 in order to provide temperature data that may be used in selecting a drive scheme.

The power module 137 may be coupled with the display controller 128 and the display device 124. The power module 137 may receive signals from the display controller 128 and generate appropriate voltages (or currents) to drive selected display pixels of the display device 124. In one embodiment, the power module 137 may generate voltages of +15V, −15V, or 0V.

The image sensor 118 may include a charge-coupled device (CCD) or complementary metal-oxide semiconductor (CMOS) type image sensor that converts light into electronic signals that represent the level of light at each pixel. Other image sensing devices that are known or may become known that are capable of converting an image formed by light impinging onto a surface into electronic signals representative of the image may also be used. The image sensor 118 may also includes circuits for converting the electronic signals into image data and interfacing with other components of the system.

The display engine 154 may perform a display update operation. The display engine 154 may include a pixel processor (not shown) and an update pipe sequencer (not shown). A display update operation may include updating display pixels of a display matrix of an electro-optic display device. In particular, a display update operation may include: (a) a pixel synthesis operation; and (b) a display output operation. A display update operation may be performed with respect to all of the display pixels of the display matrix 126 (an "entire" display update). Alternatively, a display update operation may be performed with respect to less than all of the display pixels of the display matrix 126 (a "regional" display update).

In addition, two or more regional display updates may be performed in parallel. For example, a regional display update of a first region of the display matrix 126 may operate in parallel with a regional display update of a second region, provided the first and second regions do not include any of the same display pixels or sub-pixels. As described below, the image to be rendered on a display device may include two or more images, and each sub-image or region may be processed using a different color processing algorithm. Because the pixel synthesis and display output operations are performed after color processing, and because the pixel synthesis and display output operations may be performed independently on distinct regions of the display matrix 126, it will be appreciated that simultaneous display updates may be update display pixels that were processed using different color processing algorithms.

Figure 2:
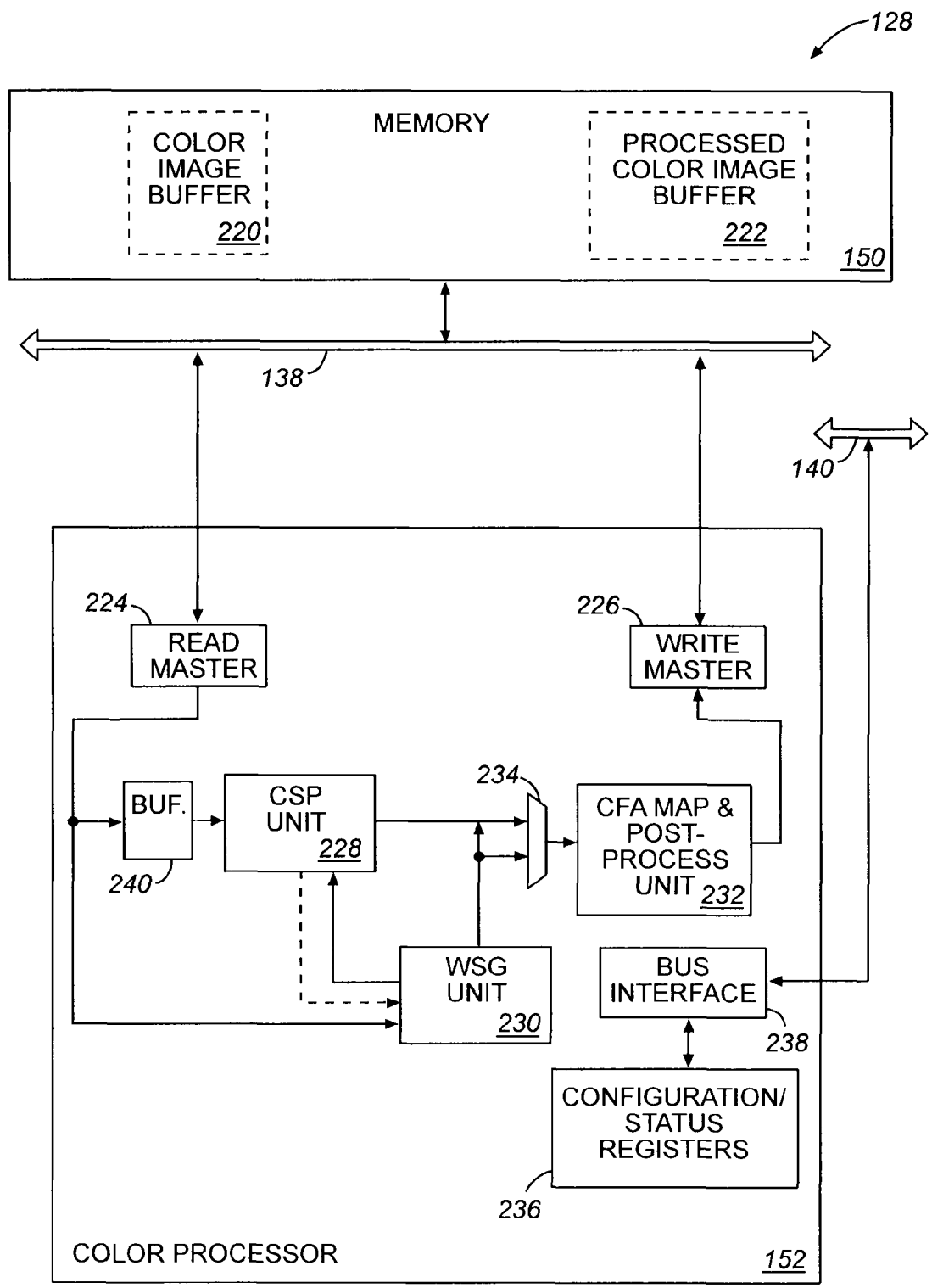
FIG. 2 is a simplified illustration of a memory and a color processor of the system of FIG. 1 according to one embodiment.

FIG. 2 illustrates the display controller 128 of FIG. 1 according to one embodiment. The display controller memory 150 may include a first portion allocated as an color image buffer 220 and a second portion allocated as a processed color image buffer 222. The color processor 152 fetches data from the color image buffer 220 and stores data in the processed color image buffer 222 using the bus 138. So that the color processor 152 may access the memory 150, it includes a Read Master unit 224 and a Write Master unit 226. In one embodiment, the color processor 152 includes a Color Synthesis of Primaries (CSP) unit 228, a White Sub-Pixel Generation (WSG) unit 230, and a CFA Mapping and Post-Processing Unit (PPU) 232. A selecting unit 234 permits the outputs of the CSP unit 228 and the WSG unit 230 to be selected for input to the PPU 232. The WSG unit 230 may receive pixel data from the CSP unit 228 and may provide saturation factor data to the CSP unit 228. The color processor 152 provides for flexible processing of image data read from the color image buffer 220. A user may configure the color processor 152 to implement a custom color processing algorithm for a particular display device by writing parameters to configuration and status registers 236 that may be included in the color processor 152. These parameters may be written by the host 122 to a bus interface 238 via the bus 140. The color processor 152 may include an input latency buffer 240 for delaying input data as required by a particular color processing algorithm.

A color processing algorithm for a particular type of display device may include: (a) color correction; (b) color linearization (sometimes referred to as gamma correction); (c) luma scaling; (d) filtering; (e) color saturation adjustment; (f) dithering; and (g) other functions. An apparatus for implementing a color processing algorithm that has the capability to include a variety of different functions would be desirable. In general, the effect of applying two or more functions in succession is additive. In other words, the final appearance of an image after performing two different functions is affected by the order in which the functions are applied. An apparatus for implementing a color processing algorithm that has the capability to perform desired functions in any order would be desirable.

Figure 3:
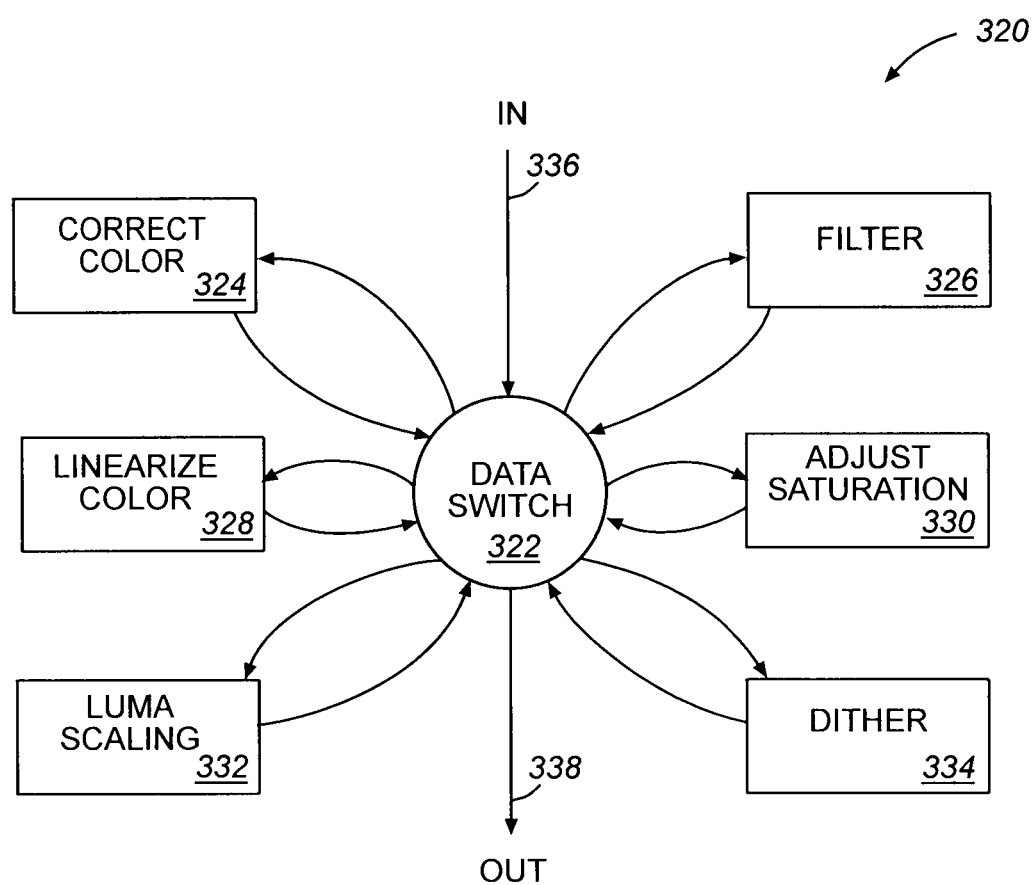
FIG. 3 illustrates a flexible data path for color synthesis of primaries according to one embodiment.

FIG. 3 illustrates a block diagram of a flexible data path 320 for color synthesis of primaries according to one embodiment. At the center of the flexible data path 320 is a data switch 322. In one embodiment, the flexible data path 320 may also include: (a) color correction module 324; (b) filtering module 326; (c) color linearization module 328; (d) color saturation adjustment module 330; (e) luma scaling module 332; and (f) dithering module 334. The data switch 322 includes an input 336 for receiving image data and an output 338 for outputting image data. Image data may be received in any desired format, e.g., RGB, YCrCb, HSL, CMY, etc. In addition, the pixel depth of input image data may be any desired number of bits, e.g., 24-bit. In one embodiment, the input image pixels may be defined in 12 bit-per-pixel resolution. The data switch 322 may be programmable or configurable. In other words, the flexible data path 320 may be configured to include one or more of the processing modules 324 to 334. In addition, the flexible data path 320 may be configured to include one or more additional modules (not shown). Any particular processing module may be included in the data path 320 more than once. In addition, the flexible data path 320 may be configured to exclude one or more of the modules 324 to 334. One advantage of the capability of exclude any particular processing module is that it permits separate analysis of each processing module apart from the effects of other processing modules. A particular module may be included or excluded from the flexible data path 320 by programming or configuring the data switch 322. The data switch 322 may be programmed or configured by storing one or more control words in the configuration and status register 236. In addition, control words may be used to specify the order in which processing modules are used and to select parameters associated with particular processing modules.

Figure 4:
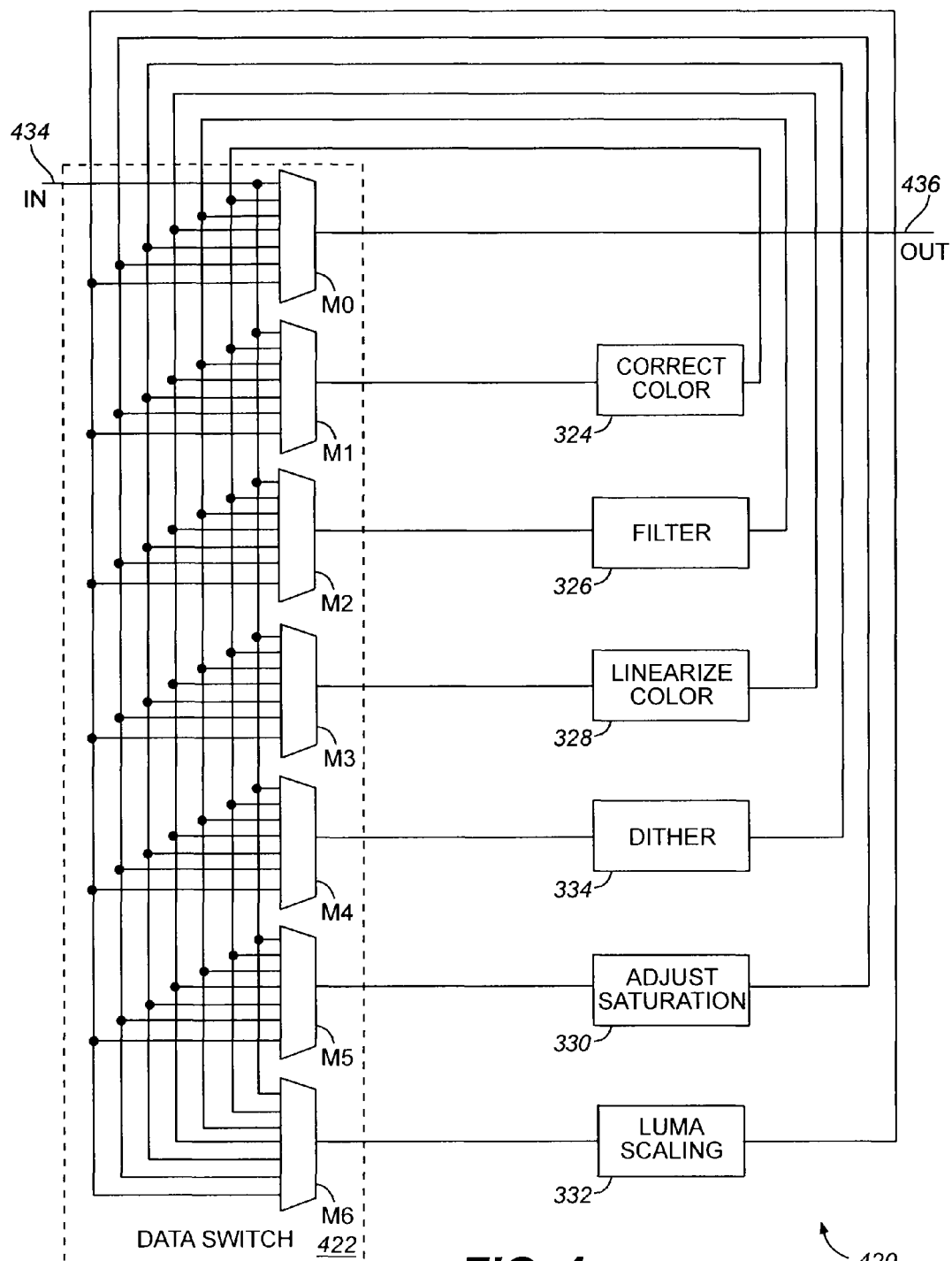
FIG. 4 is a block diagram of an exemplary circuit for implementing the flexible data path of FIG. 3.

FIG. 4 illustrates a block diagram of a circuit 420 for implementing the flexible data path 320 for color synthesis of primaries according to one embodiment. The circuit 420 may be included in the CSP unit 228 in one embodiment. The circuit 420 may include, in one embodiment, a data switch 422 and a variety of processing modules. In one embodiment, the circuit 420 may include the color correction module 324, filtering module 326, color linearization module 328, dithering module 334, color saturation adjustment module 330, and luma scaling module 332. The data switch 422 may include multiplexers M0 to M6, or any other suitable selecting device. Each of the multiplexers M0 to M6 includes a select input (not shown). The select inputs are used to select the processing modules that are to be included in a color processing algorithm as well as to program the order in which processing modules are used. The data switch 422 includes an input 434 for receiving image data and an output 436 for outputting image data. Input image data may be any desired number of bits.

For purposes of illustration, assume that the inputs of each of the multiplexers M0 to M6 are numbered 0 to 6 from top to bottom. As one example, all of the modules may be bypassed by selecting the 0 input of multiplexer 0. As a second example, to select modules in the order (1) linearize color 328, (2) filter 326, (3) color correct 324, (4) adjust saturation 330, and (5) dither 334, excluding the luma scaling module 332, the inputs of the multiplexers should be selected as follows: (a) multiplexer M0—select input 4, (b) multiplexer M1—select input 2, (c) multiplexer M2—select input 3, (d) multiplexer M3—select input 0, (e) multiplexer M4—select input 5, and (f) multiplexer M5—select input 1.

Turning now to exemplary modules in that may be included in the flexible data path 320 of FIG. 3, the color correction module 324 may be used as part of a color processing algorithm for a particular type of display device to generate color-corrected pixels. The color correction module 324 may make independent adjustments to each color component of a pixel. The level of reflectance of an EPD pixel or sub-pixel may be less than one hundred percent. Consequently, when a color image is rendered on an EPD, colors may tend to lack brightness, saturation, or both brightness and saturation. In addition, when a color image is rendered on a display device, it may have a "color cast." An image rendered on a display device that lacks brightness or saturation, appears too dark.

An image rendered on a display device that has a color cast may appear tinted. A color cast may be the result of properties of the display device or properties inherent in the image data. To compensate for a lack of brightness, undesirable or unnatural appearances, or other issues, the color correction module 324 may be used to modify the brightness or saturation of pixels. In addition, the color correction module 324 may be used to shift color values. In one embodiment, the color correction module 324 may include logic to multiply an RGB vector by a 3×3 kernel matrix, and to add the product to an RGB offset vector, RGB-outoff. Stated symbolically, the color correction module 324 may be used to evaluate the following expression:

$$\begin{bmatrix} R' \\ G' \\ B' \end{bmatrix} = \begin{bmatrix} K_{11} & K_{12} & K_{13} \\ K_{21} & K_{22} & K_{23} \\ K_{31} & K_{32} & K_{33} \end{bmatrix} \times \begin{bmatrix} R_0 + R_{inoff} \\ G_0 + G_{inoff} \\ B_0 + B_{inoff} \end{bmatrix} + \begin{bmatrix} R_{outoff} \\ G_{outoff} \\ B_{outoff} \end{bmatrix}$$

where $R_0$, $G_0$, and $B_0$ are input RGB values. The R', G', and B' are color corrected values. The respective RGB "inoff" and "outoff" are offset values. The "K" values of the 3×3 kernel matrix may be programmable coefficients. In addition to changing pixel intensity or brightness, the color correction module 324 may be used to perform a color space conversion in addition to its use for correcting color. For example, RGB may be converted to YCrCb, YCrCb may be converted to RGB, or YCrCb may be converted to CMY using the above expression. In a color space conversion configuration, different input, output, and offset variables may be substituted. For example, the RGB input values $R_0$, $G_0$, and $B_0$ in the above expression may be replaced with $Y_0$, $Cr_0$, and $Cb_0$, and the corrected values R', G', and B' may be replaced with either Y'Cr'Cb' or C'M'Y'. Moreover, the color correction module 324 may be used to implement a scaling function with or without an offset. For example, the color correction module 324 may be used to adjust color saturation of an image defined in YCrCb space. This may be accomplished by programming the K values of the kernel matrix as shown in the expression below:

$$\begin{bmatrix} Y' \\ Cr' \\ Cb' \end{bmatrix} = \begin{bmatrix} 1 & 0 & 0 \\ 0 & S & 0 \\ 0 & 0 & S \end{bmatrix} \times \begin{bmatrix} Y_0 + 0 \\ Cb_0 + 0 \\ Cr_0 + 0 \end{bmatrix} + \begin{bmatrix} 0 \\ 0 \\ 0 \end{bmatrix}$$

where S is a saturation adjustment factor.

The filtering module 326 may be used as part of a color processing algorithm for a particular type of display device to sharpen, blur, or value-scale an image. In addition, the filtering module 326 may be used for other purposes, such as bump mapping and line detection. The filtering module 326 may include a separate filter for each color channel. In one embodiment, the filters may be 3×3 filters. For example:

$$\begin{bmatrix} R' \\ G' \\ B' \end{bmatrix} = \begin{bmatrix} K_{11} & K_{12} & K_{13} \\ K_{21} & K_{22} & K_{23} \\ K_{31} & K_{32} & K_{33} \end{bmatrix} \times \begin{bmatrix} R_0 \\ G_0 \\ B_0 \end{bmatrix}$$

The $R_0$, $G_0$, and $B_0$ are original color values, the R', G', and B' are filtered color values, and the programmable kernel values "K" define the filter. It is not critical that the filtering module 326 process RGB pixel data. The filtering module 326 may process pixel data in any desired format, e.g., YCrCb. In one embodiment, the type of filtering that is performed may be different on each color channel. For example, the filter on a Y channel may be a sharpening filter while the filters on Cr and Cb channels may perform blurring or saturation adjustment.

The color linearization module 328 may be used as part of a color processing algorithm for a particular type of display device to generate pixels that are compensated for the non-linearity of the response of the display device to input pixel values. In an EPD or other display device, the brightness of a pixel generated in response to a signal may not be a linear function of the signal. In one embodiment, the color linearization module 328 may include three 256 entry look-up tables (LUT), one for each color channel, each LUT defining a function to compensate for non-linearity of display device response. More specifically, the color linearization module 328 may implement a compensation function on each of three color channels. For example, the color linearization module 328 may implement the following:

$$R'=f(R_0)$$

$$G'=f(G_0)$$

$$B'=f(B_0)$$

The R', G', and B' are linearized color values. The color linearization LUTs may store entries of any suitable precision. For example, the color linearization LUTs may be 8 or 6 bits wide. In one alternative, the color linearization LUTs may be 4 bits wide.

The color saturation adjustment module 330 may be used as part of a color processing algorithm for a particular type of display device to adjust levels of saturation in color pixels. The color saturation adjustment module 330 may make independent adjustments to each color component of a pixel. The color saturation adjustment module 330 may accept input data in any desired color format. For example, the color saturation adjustment module 330 may accept input data in RGB, YCrCb, HSL, CMY, etc. However, input image data is typically provided in RGB format.

One known way to adjust the color saturation of an RGB image is to convert the image to the YCbCr color space, multiply the Cb and Cr values of each YCbCr pixel by adjustment factor S, and then convert the YCbCr image back to the RGB color space. The two color space conversion operations, however, make this method inefficient. In one embodiment, the color saturation adjustment module 330 adjusts the color saturation of an RGB image by first determining the Y component for each pixel of the RGB image. The Y component is determined according to the following equation:

$$Y=(0.299 \times R_0)+(0.587 \times G_0)+(0.114 \times G_0)$$

where $R_0$, $G_0$, and $B_0$ are color components of an original or input RGB image pixel. Second, the Y component is individually subtracted from each of the RGB components. The difference is then multiplied by an adjustment factor S. Finally, the products produced in the second operation are added to the Y component. The respective sums are the saturation adjusted RGB components. Equations for the saturation adjusted components R', G', and B' are presented below:

$$R'=S \times (R_0-Y)+Y$$

$$G'=S \times (G_0-Y)+Y$$

$$B'=S \times (B_0-Y)+Y$$

One adjustment factor S may be used for all three RGB components. Alternatively, three unique adjustment factors S may be used for each of the respective RGB components. In addition, the adjustment factor S may be uniquely defined for each combination of RGB input image component values. In other words, in one embodiment, S=f(R,G,B). Alternatively, the adjustment factor S may be uniquely defined for each combination of YCrCb input image component values. In one embodiment, the saturation factor S may be a constant.

Figure 5:
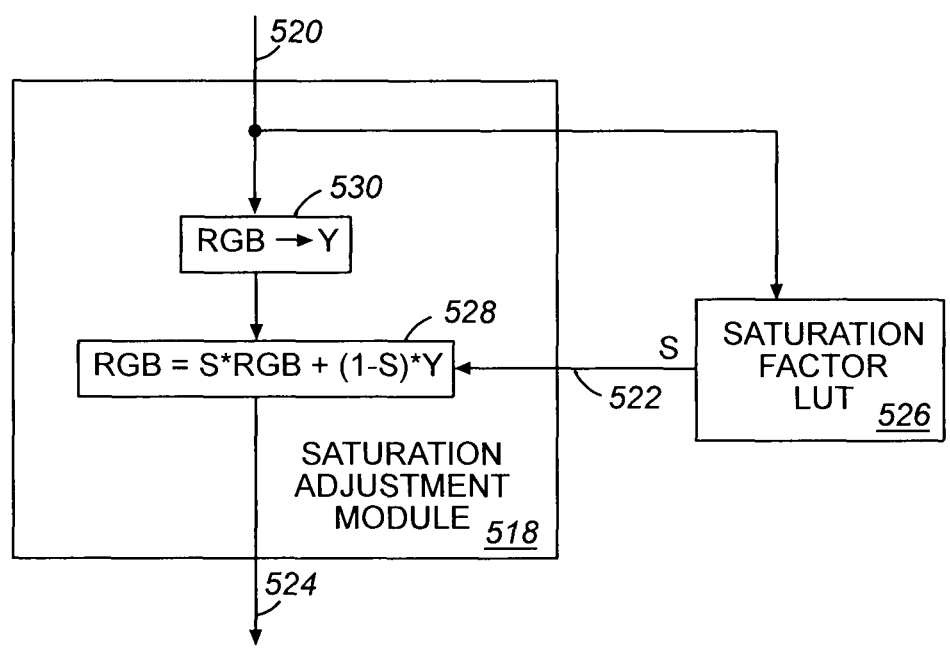
FIG. 5 is a simplified block diagram of an exemplary saturation adjustment unit according to one embodiment.

FIG. 5 illustrates a saturation adjustment module 518 according to one embodiment. The saturation adjustment module 518 includes input 520 for receiving pixel data, an input 522 for receiving a saturation factor value S, and an output 524 for outputting a saturation adjusted pixel. The pixel data received on the input 520 may be in any desired color format. In one embodiment, the pixel data received on the input 520 may be in the RGB color format. In one embodiment, the pixel data received on the input 520 is used as an index to a look-up table memory (LUT) 526, which responds to an index by furnishing a saturation factor value S to the saturation adjustment unit 518. The pixel data received on the input 520 may be in any desired bit-per-pixel resolution. For example, if the input image pixels are defined in 12 bit-per-pixel resolution, the lookup table 526 stores 4096 adjustment factors S. The saturation adjustment unit 518 includes a calculating module 528 that evaluates the expression:

$$RGB'=(S \cdot R_0 G_0 B_0)+((1-S) \cdot Y),$$

where RGB' is a saturation-adjusted $R_0 G_0 B_0$ pixel, S is the saturation factor value, and Y is the luma value of the input pixel $R_0 G_0 B_0$. The luma value Y may be calculated using second calculating module 530, which may evaluate the equation:

$$Y=(0.299 \times R_0)+(0.587 \times G_0)+(0.114 \times G_0)$$

In one embodiment, the saturation adjustment module 518 and the saturation adjustment module 330 may be the same.

Referring again to FIG. 3, the luma scaling module 332 may be used as part of a color processing algorithm for a particular type of display device to adjust the lightness or brightness of a digital image. In addition, the luma scaling module 332 may be used to adjust the contrast in a digital image. Further, the luma scaling module 332 may be used to adjust color saturation or pixels defined in the YCrCb color space. As one example, the luma scaling module 332 may implement the following:

$$R'=R_0 \times P+C$$

$$G'=G_0 \times P+C$$

$$B'=B_0 \times P+C$$

The $R_0$, $G_0$, and $B_0$ are original color values and the R', G', and B' are luma scaled color values. A scale factor is P and a scale offset is C. In one alternative, the luma scaling module 332 may be used as part of a color processing algorithm for a particular type of display device to adjust the brightness or saturation of pixels in the luma, chroma-blue, chroma-red (YCrCb) color space. That is, original colors values $Y_0$, $Cr_0$, and $Cb_0$ may be substituted for $R_0$, $G_0$, and $B_0$ in the above equations.

The dithering module 334 may be used as part of a color processing algorithm for a particular type of display device. The number of brightness or intensity levels for sub-pixels that is available in some display devices may be less than 256. For example, an EPD pixel may include sub-pixels having 16 intensity levels. In this case for example, a 12-bit RGB data value (4:4:4) may be used to define all possible pixel colors. The gamut of colors that corresponds with 12-bit RGB data is a relatively small 4,096. The dithering module 334 may be included in the color processing algorithm to increase the apparent color gamut of a display device The dithering module 334 may employ an error-diffusion scheme, an ordered-diffusion scheme, or any other diffusion suitable scheme.

Figure 6:
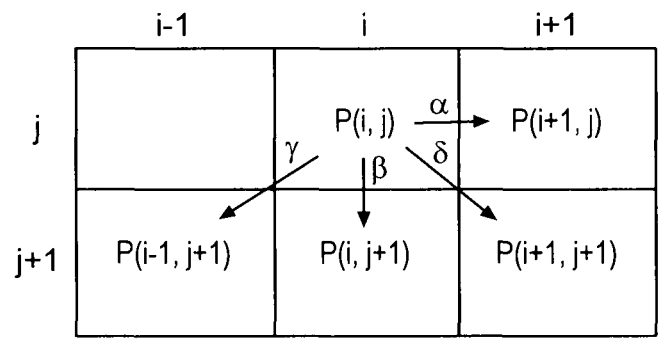
FIG. 6 is a diagram illustrating an exemplary diffusion of quantization error of an input pixel to pixels neighboring the input pixel.

In one embodiment, the dithering module 334 may employ an error-diffusion scheme. In an exemplary error-diffusion scheme, pixels of an input image are processed in raster order. The bit-depth of the input pixels may be greater than the bit-depth of the output pixels. For example, the input pixels may be 24-bit RGB data (8:8:8), whereas the output pixels may be 12-bit RGB data (4:4:4). A quantization error may be calculated for each input data pixel according to the following equation:

$$\text{err}(i,j)=P(i,j)-P'(i,j)$$

where P(i, j) is a pixel of an input image in the native bit-depth, e.g., 24-bit per pixel, P'(i, j) is the pixel of an input image in the bit-depth that will be provided as an output of the dithering process (the "quantized" pixel value), e.g., 12-bit per pixel, and i and j are column and row indices. In one embodiment, a quantization error may be calculated for each input data sub-pixel. As shown in FIG. 6, the quantization error may be diffused to four neighboring pixels. The amount of the error that is distributed to a particular neighbor is determined by a weight coefficient. Where the quantization error is distributed to four neighbors, there may be four weight coefficients, $\alpha$, $\beta$, $\gamma$, $\delta$, which are subject to following condition:

$$\alpha+\beta+\lambda+\delta=1$$

FIG. 6 shows one example of how weight coefficients may be used to diffuse a quantization error associated with input pixel P(i, j) to neighbor pixels P(i+1, j), P(i−1, j+1), P(i, j+1), and P(i+1, j+1), where i and j are, respectively, column and row indices.

Figure 7:
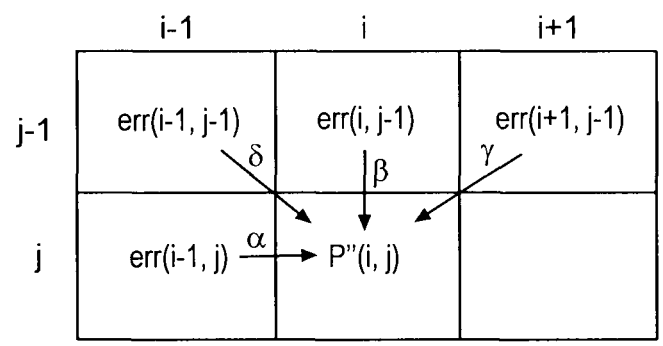
FIG. 7 is a diagram illustrating quantization errors of neighbor pixels that may be used in an exemplary calculation of a dithered pixel.

FIG. 7 shows neighbor pixels and associated weight coefficients that may be included in a calculation of a dithered pixel P''(i, j), according to one embodiment. A dithered pixel value may be calculated by adding error terms to the quantized pixel value P'(i, j). For example, the value of dithered pixel P''(i, j) may be determined according to the following equation:

$$P''(i,j)=P'(i,j)+\alpha \times \text{err}(i-1,1)+\beta \times \text{err}(i,j-1)+\lambda \times (i+1,j-1)+\delta \times (i-1,j-1)$$

The $\alpha$, $\beta$, $\gamma$, $\delta$ coefficients used by the dithering module 334 may be programmed or configured to suit a color processing algorithm for a particular type of display device. In addition, the particular neighbor pixels that are used in the error term calculation may be programmed to suit a particular color processing algorithm. For example, dithering module 334 may be configured to include only the two neighbor pixels, such as only the horizontally and vertically adjacent pixels. To facilitate calculation of a current pixel, the dithering module 334 may include a buffer to store error terms for one line of pixel data (e.g., line j−1) plus the pixel value on the same line (e.g., line j) and to the left of the currently processed pixel.

The range of pixel color values for which dithering is enabled may be programmed or configured for a particular color processing algorithm. For example, consider an input image defined by 6-bit RGB data (6:6:6) that includes both a color photograph, and black and white text. In this example, a pixel having the maximum value of 32d:32d:32d may appear white, while a pixel having the minimum value of 0d:0d:0d may appear black. The range of pixel color values may be set to exclude dithering of the textual portion of the image, while at the same time to include dithering of the color photograph portion of the image by setting, for example, a range having a maximum of 30d:30d:30d and a minimum of 2d:2d:2d. In this example, the 6.25% whitest and the 6.25% blackest pixels are excluded from dithering. Any desired or suitable range of values to exclude from dithering may be selected. The capability to configure a color processing algorithm may be desirable because dithering textual image data can reduce the quality of the rendered image of the text. In an alternative embodiment, as described below, the dithering module 334 may be programmed or configured to operate at sub-pixel resolution.

Figure 8:
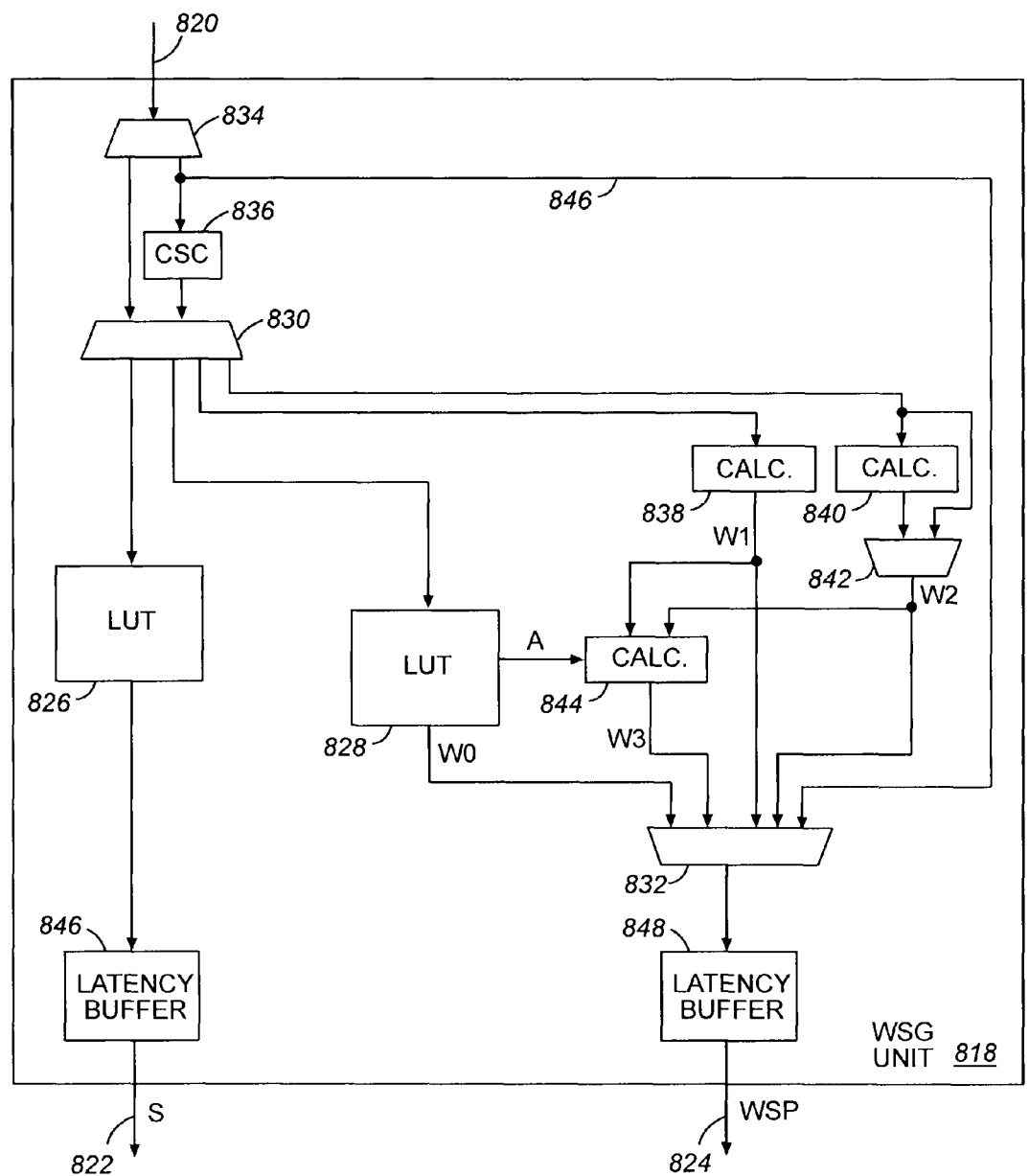
FIG. 8 is a simplified diagram of an exemplary white sub-pixel generation unit according to one embodiment.

Referring again to FIG. 2, the color processor 152 may include a WSG unit 230. FIG. 8 illustrates a white sub-pixel saturation (WSG) unit 818 according to one embodiment. The WSG unit 818 includes an input 820 for pixel data and may include two outputs 822, 824, one for outputting a saturation factor S and another for outputting "fourth sub-pixel" ("WSP") data. The input pixel data may be defined in any color space. For example, the input pixel data may be RGB, YCrCb, HSL, or CMY. The WSG unit 818 may include a first lookup table (LUT) memory 826 for storing saturation factors, and a second lookup table (LUT) memory 828 for storing fourth pixel values. The WSG unit 818 may also include a first input/output path selector 830 and a second input path selector 832. In addition, the WSG unit 818 may include a third output path selector 834 and a color space converter ("CSC") 836. The color space converter 836 may be employed, for example, to convert input pixel data in RGB format to YCrCb or CMY format. In one embodiment, the color space converter 836 may convert pixel data in a first color format into a single component of pixel data in a second color format. For example, the color space converter 836 may convert RGB pixel data into the Y component of YCrCb pixel data according to the following expression:

$$Y = 0.299R + 0.587G_0 + 0.144B_0$$

In one embodiment, the LUT 826 may be employed to store saturation factor values S that may be used by a color saturation module, e.g., module 330. The saturation factor values S may be stored in the LUT 826 by a user. The saturation factor values S stored in the LUT 826 may be user determined values based on the image rendering properties of a particular display device. By storing saturation factor values S in the LUT 826, a color processing algorithm may include a non-linear saturation factor in a color saturation adjustment function. A non-linear saturation function may provide an advantage over a linear saturation function in that it provides increased control of the color gamut that may be rendered on an EPD. Saturation factor values S may be retrieved from the LUT 826 using different arguments or indices. The retrieval index may be determined by appropriately configuring path selectors 830 and 834, and color space converter 836. In one configuration, a pixel value received at input 820 may be used as an index to the LUT 826. For example, a down-sampled RGB or YCrCb pixel value may be used as an index for retrieving a stored saturation factor value S. As another example, an RGB pixel may be received on input 820 and converted to a YCrCb pixel, which may then be used as an index. In another configuration, a single component of a color pixel may be used as an index to the LUT 826. For example, the R value of a received RGB pixel, or the Y value of YCrCb pixel may be used as an index for retrieving a stored saturation factor value S. In the latter example, the Y value of the YCrCb pixel may determined from a YCrCb pixel received on input 820, or the Y value may be received from the color space converter 836 following conversion of a received RGB pixel. In yet another configuration, a constant saturation factor value S may be stored in the LUT 826, providing a constant value for S.

The color processing algorithm for a particular type of display device may include adding a fourth sub-pixel "WSP" to three-component pixel data. For example, a white sub-pixel may be added to each RGB triplet to create RGBW pixels, or a white sub-pixel may be added to each CMY triplet to create CMYW pixels. The fourth sub-pixel may be added to pixels of any color model and the fourth sub-pixel need not be white. The fourth sub-pixel may be any suitable color or may be no color. For instance, a fourth sub-pixel may be yellow or black, e.g., RGBY, CMYB, or CMYK pixels may be generated. In addition, in one embodiment, a fourth sub-pixel for inclusion with an RGB pixel may be a duplicate of the green sub-pixel of the RGB triplet. In other words, the resultant pixel is RGBG, where the G values are identical. The G value of an RGB pixel may be passed from input 820 to output 824 using data path 846.

The WSG unit 818 may provide several options for determining fourth sub-pixel values. The choices may include calculating options and lookup table options. The first input/output path selector 830 may be configured to choose an option for determining a fourth sub-pixel. Depending on the option, different parameters are required. The parameters may be taken directly from, or may be derived from, the input pixel value received on input 820. The color space converter 836 may color space convert an input pixel, and the third output path selector 834 may be configured to include or exclude the color space converter 836.

In a first option, the LUT 828 may be employed to store fourth sub-pixel data. The WSG unit 818 may allow retrieval of a fourth sub-pixel from the LUT 828 using a pixel value as an index to the LUT. For example, a down-sampled RGB or YCrCb pixel value may be used as an index for retrieving a fourth sub-pixel. The fourth sub-pixel values may be stored in the LUT 828 by a user. The fourth sub-pixel values stored in the LUT 828 may be user-determined values based on the image rendering properties of a particular display device.

In various alternative options, the fourth sub-pixel may be calculated. In one embodiment, the fourth sub-pixel may be calculated using a calculating unit 838, which evaluates the expression:

$$W1 = \min(RGB),$$

where "W1" is the calculated fourth sub-pixel and is set to the minimum of the R, G, and B sub-pixel values. When the calculating unit 838 is used for determining fourth sub-pixel values, the path selectors 830 and 834 are configured to provide RGB pixel values to the input of calculating unit 838.

In another option, the fourth sub-pixel may be calculated using calculating unit 840, which evaluates the expression:

$$W2 = (\alpha \cdot R) + (\beta \cdot G) + (\lambda \cdot B),$$

where the fourth sub-pixel "W2" is a weighted average of the RGB sub-pixel values. When this option is desired, the path selectors 830 and 834 are configured to provide RGB pixel values to the input of calculating unit 840. The coefficients α, β, and λ, may be selected by a user by writing appropriate values to configuration and status registers 70.

In yet another option, the path selectors 830 and 834 are configured to provide YCrCb pixel values to the input of calculating unit 840, but a fourth path selector 842 is configured so that the calculating unit 840 is bypassed. In this option, W2 is set equal to luma, i.e., W2=Y. In still another option, the fourth sub-pixel may be calculated using calculating unit 844, which evaluates the expression:

$$W3=((1-A)\cdot W2)+(A\cdot W1),$$

where W1 and W2 are determined using one of the methods described above. The weighting factor A may be selected to weight one of W1 or W2 more heavily, or both may be weighted equally, in the determination of the fourth sub-pixel "W3." A user may select a desired value for A by writing an appropriate value to configuration and status registers 236. Alternatively, the weighting factor A may be varied as function of input pixel value. In this alternative, a user may store a set of weighting factors A in the LUT 828.

The WSG units 230 and 818 may include a saturation factor latency buffer 846 that may be used to buffer the S output 822, and a fourth sub-pixel latency buffer 848 that may be used to buffer the WSP output 824. The latency buffers 846 and 848, and the input latency buffer 240, may be used individually or in combination to synchronize aspects of the respective operations of the CSP unit 228 and the WSG unit 818 (or WSG unit 230), which operate in parallel. In particular, it may be necessary to synchronize the outputting of a saturation factor S by the WSG unit 818 to the saturation adjustment module 330 (or unit 518) of a CSP unit. In addition, it may be necessary to synchronize the outputting of pixel data by CSP and WSG units to the CFA mapping and post-processing unit 232. The latency buffers 846, 848, and 240 may be variable depth FIFOs.

A method for determining how latency buffers may be according to one embodiment set is next described. In a first step, the processing modules to be used and the order in which the modules are use for a color processing algorithm are determined. Once the modules to be used and the order of operations are determined, a second step includes calculating the latency through a CSP unit up to completion of a saturation adjustment operation, and calculating the total latency through the CSP unit. In a third step, latencies of the WSP unit for determining saturation factor S and determining a fourth sub-pixel, if applicable, are calculated. In a fourth step, the latencies calculated for the CSP and WSP data paths are compared. If the total latency through the CSP unit is less than the latency for determining a fourth sub-pixel by the WSG unit, the input latency buffer 240 may be set to the difference between the two latency values. On the other hand, if the total latency through the CSP unit is greater than the latency for determining a fourth sub-pixel by the WSG unit, the fourth sub-pixel latency buffer may be set to the difference between the two latency values. Finally, if the latency through the CSP unit up to completion of the saturation adjustment operation is greater than the latency for determining a saturation factor by the WSG unit, the saturation factor latency buffer is set to the difference between the two latency values. In one embodiment, a table containing all possible configurations for the CSP and WSG units may be provided. The table may additionally contain latency values corresponding with each configuration. The second and third steps may be automatically performed by looking up latency values in the table once configurations are set. A comparing circuit may then compare latency values from the table to determine appropriate latency buffer settings. The comparing circuit may automatically establish the latency buffer settings. The table may be stored in a memory.

Figure 9:
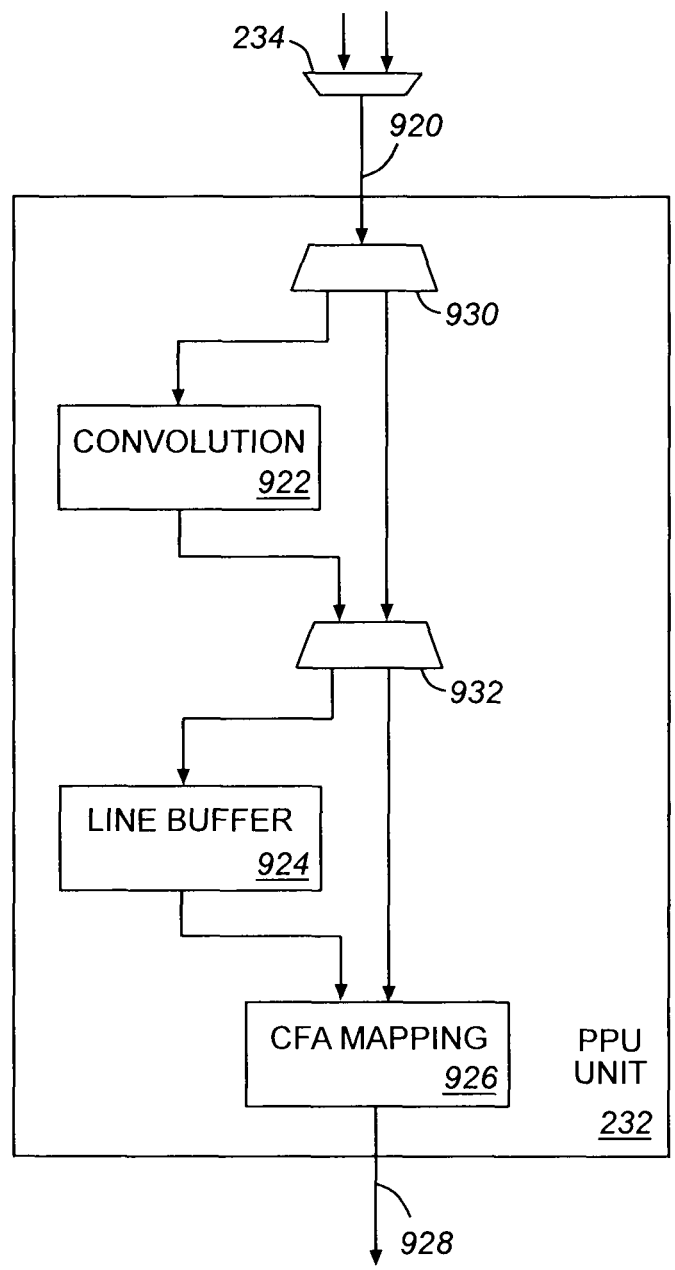
FIG. 9 illustrates an exemplary CFA mapping and post-processing unit according to one embodiment.

FIG. 9 illustrates a CFA Mapping and Post-Processing Unit (PPU) 232 according to one embodiment. The PPU 232 may include an input 920, a convolution unit 922, a line buffer 924, a CFA mapping unit 926, and an output 928. In addition, the PPU may include other components, such as selecting units 930 and 932. The PPU 232 may be programmed or configured to operate in one of two modes: sub-pixel or pixel mode. In addition, the PPU 232 may output sub-pixel data in a user-defined CFA format.

In one embodiment, the PPU 232 may accept as input pixel data having four color components, e.g., RGBW, CMYW. In alternative embodiments, the PPU 232 may accept pixel data defined by any number of components. The selecting unit 234 may be configured to obtain three color components from a CSP unit and a fourth color component from a WSG unit, or to obtain four color components from a WSG unit. After processing by the PPU 232, the sub-pixel data may be stored in the processed color image buffer 222. The PPU 232 writes sub-pixel data to the processed color image buffer 222 so that it is arranged in the buffer 222 for fetching by the display engine 154 in raster order.

In the sub-pixel mode of operation of PPU 232, each pixel of an input image is mapped to one sub-pixel of a display device. Consequently, sub-pixel mode requires that the resolution of the input image be higher than the resolution of the display device. For example, each pixel of a 1,200×1,600 pixel color input image may be mapped to one sub-pixel of a 600×800 sub-pixel display device that has four sub-pixels per display pixel. In addition, just one color component of each pixel of the input image may be sampled in the mapping process. The sampled color component may be assigned to a mapped display sub-pixel. Alternatively, the value assigned to a mapped display sub-pixel may be determined based, at least in part, on a corresponding pixel's color components. For example, a mapped display sub-pixel may be assigned the value of a fourth sub-pixel, where the fourth sub-pixel is determined based on the RGB or CMY values of the corresponding input pixel.

Figure 10:
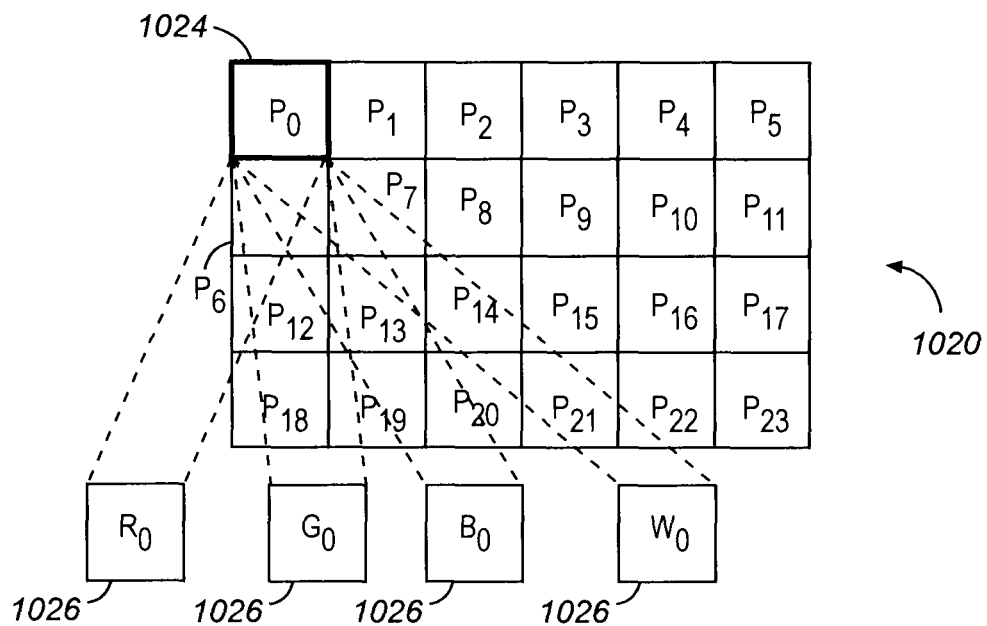
FIG. 10 illustrates an example of mapping samples of input image pixels to sub-pixels of a display device.
Figure 10:
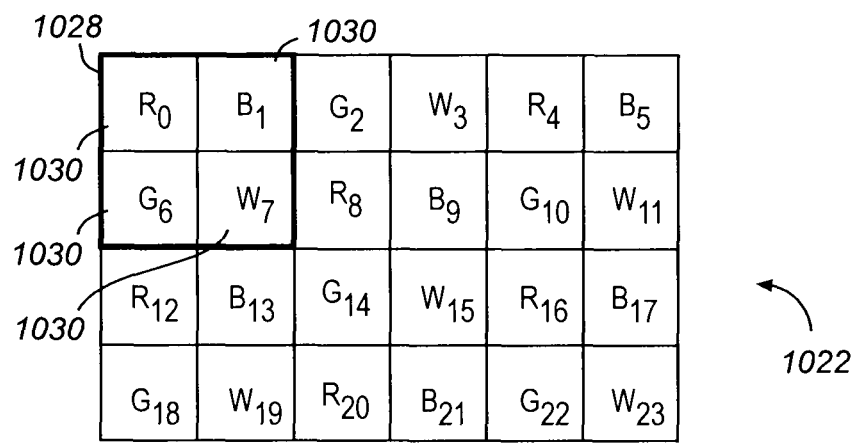

FIG. 10 illustrates an example of mapping samples of input image pixels to sub-pixels of a display device. A portion of an exemplary color input image 1020 and a portion of an exemplary display device 1022 are shown in FIG. 10. The color input image 1020 includes pixels 1024. Each input pixel 1024 includes two or more color components 1026, which in this example are R, B, G, and W color components. The display device 1022 includes display pixels 1028. In this example, each display pixel 1028 includes R, B, G, and W sub-pixels 1030. FIG. 10 illustrates that each pixel of an input image may be mapped to one sub-pixel of a display device in sub-pixel mode. For example, input pixel $P_0$ may be mapped to display sub-pixel $R_0$, input pixel $P_1$ may be mapped to display sub-pixel $B_1$, input pixel $P_6$ may be mapped to display sub-pixel $G_6$, and input pixel $P_7$ may be mapped to display sub-pixel $W_7$. FIG. 10 also illustrates that one color component of each pixel of the input image may be sampled and the sampled component assigned to the mapped sub-pixel. For example, the $R_0$ color component of input pixel $P_0$ is sampled and assigned to the mapped sub-pixel $R_0$. Similarly, the $B_1$ color component of input pixel $P_1$ is sampled and assigned to the mapped sub-pixel $B_1$. The components of an image pixel not sampled may not be assigned to display sub-pixel. For instance, color components $G_0$, $B_0$, and $W_0$ of input pixel $P_0$ are not sampled and not assigned to a display sub-pixel.

An advantage of the sub-pixel mode of mapping of the PPU 232 is that it may produce better color appearance than the pixel mode of operation. Use of the sub-pixel mode of mapping may result in image artifacts, however. For example, in an image with a high gradient, gray-scaled edges may become colored. Empirical testing indicates that image artifacts resulting from processing an input image in sub-pixel mode may be reduced by processing the input pixels with a convolution operation, which implements a blurring function. The convolution operation is preferably performed before a sub-pixel mapping operation. The convolution operation may be performed by convolution module 922. A user may configure the selecting unit 930 to include or bypass the convolution module 922, as desired for a particular color processing algorithm.

In the pixel mode of operation of PPU 232, each pixel of an input image is mapped to one pixel of a display device. For example, each pixel of a 600×800 pixel input image is mapped to one pixel of a 600×800 pixel display. If each display pixel includes four sub-pixels, each input pixel is mapped to four sub-pixels in the display.

When mapping is performed in pixel mode, the line buffer 924 may be used to store one line of the input image. The input image may be received by the PPU unit 232 in raster order. In addition, the color components of each pixel may appear adjacent one another in the input data stream. For example, if pixels of the input image are in an RGBW format, the four color components of each input pixel may arrive in parallel at the input 920. The sub-pixels of an RGBW pixel may not, however, appear adjacent one another in an output data stream, i.e., the order in which sub-pixel data are written to the processed color image buffer 222. Instead, the sub-pixels of a particular input pixel may appear on different lines in the output data stream, as illustrated in a portion of an image 1120 and a portion of a display device 1122 shown in FIG. 11. The image portion 1120 includes part of a line of pixels $P_0$, $P_1$, etc. The display device portion 1122 also includes part of a line of display pixels $P_0$, $P_1$, $P_2$. Each display pixel includes R, G, B, and W sub-pixels. It may be seen from the example of FIG. 11 that the $R_0$ and $B_0$ sub-pixels in the display device 1122 are side-by-side on a first line, and the $G_0$ and $W_0$ sub-pixels are side-by-side on a second line. If sub-pixels are written to the processed color image buffer 222 in raster order in pixel mode, there will be a time delay after writing sub-pixels $R_0$ and $B_0$ and before writing sub-pixels $G_0$ and $W_0$, i.e., the sub-pixel pairs may be non-adjacent in the output data stream. By storing one line of an input image in the line buffer 924, the sub-pixels of a particular pixel need not all be written at the same time, i.e., the sub-pixels may be placed in non-adjacent locations in the output data stream. A user may configure the selecting unit 932 to include or bypass the line buffer 924, as desired for a particular color processing algorithm.

Figures 11, 12:
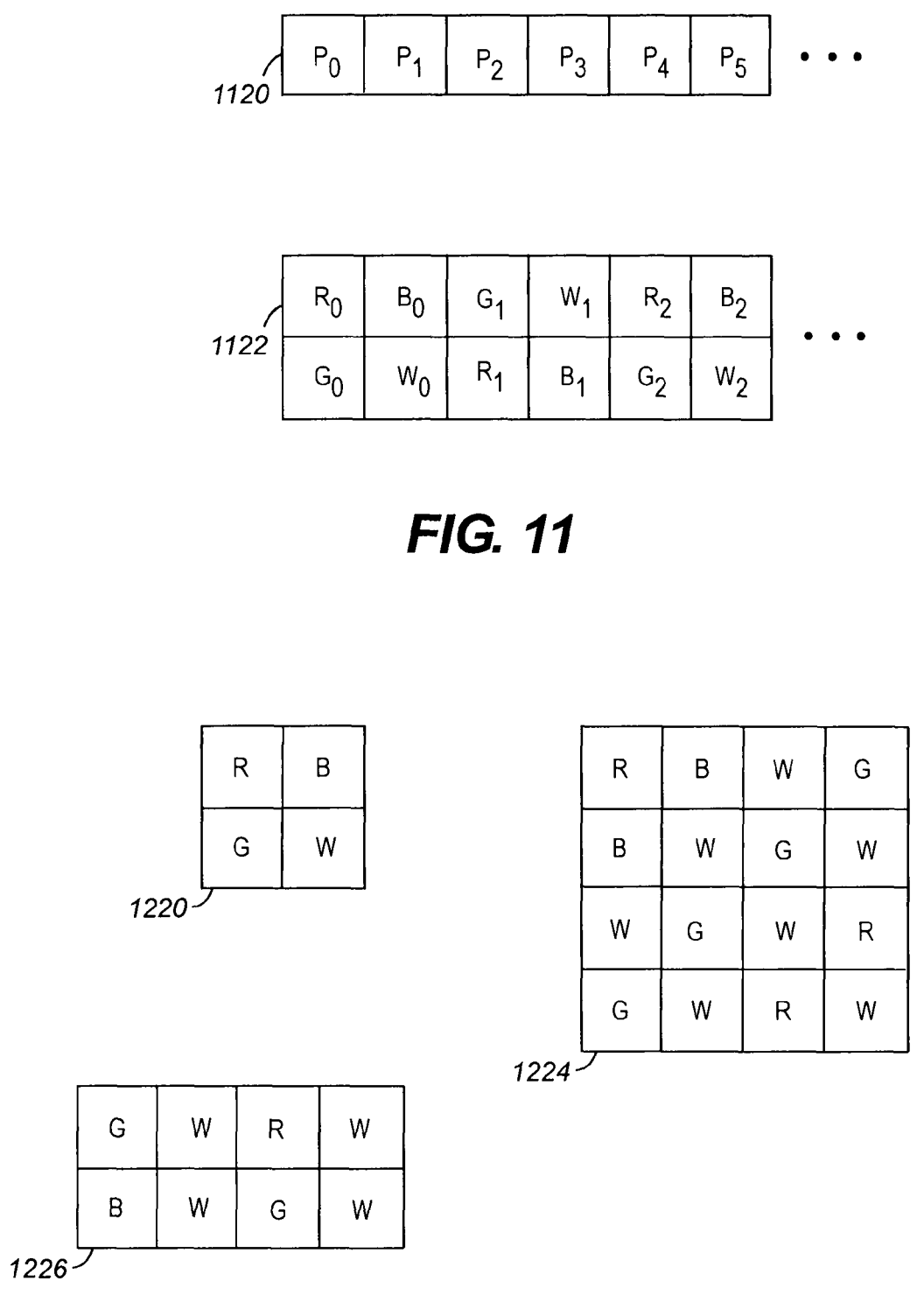

According to one embodiment, the PPU 232 may provide for flexible CFA mapping, i.e., the PPU 232 may be configured to output sub-pixel data in a user-defined CFA format. Different display devices may employ different CFAs. Consequently, it may be desirable to have a capability to map sub-pixels to a variety of different CFAs. CFAs may be viewed as arranging sub-pixels in columns and rows. Different CFAs may have different numbers of columns and rows. While sub-pixels may be square, this is not critical. Sub-pixels may be any desired shape, rectangular, polygonal, circular, etc. FIG. 12 illustrates several exemplary CFAs configurations. CFA 1220 is a 2×2 sub-pixel matrix. CFA 1224 is a 4×4 sub-pixel matrix. CFA 1226 is a 2×4 sub-pixel matrix. In one embodiment, a user may write parameters to configuration and status registers 236 that specify the dimensions of the CFA in terms of number of rows and columns. In addition, a user may write parameters to the configuration registers 236 that specify the color component to be assigned to a matrix location. For instance, if a 2×2 sub-pixel matrix, the locations may be defined in terms of rows and columns (row, column): (1, 1), (1, 2), (2, 1), and (2, 2). A user may specify that R is assigned location (1, 1), B is assigned location (1, 2), G is assigned location (2, 1), and W is assigned location (2, 2), for example. The PPU 232 then uses the specified CFA dimensions and mapping scheme to map pixel data to sub-pixels of a display device. Specifically, the PPU 232 may include horizontal and vertical sub-pixel counters that may be configured to place the sub-pixels in matrix locations corresponding to the designated mapping and CFA size.

In an alternative embodiment, referring again to FIG. 3, the dithering module 334 may be programmed or configured to operate at sub-pixel resolution. As described above, the PPU 232 may be programmed or configured to operate in sub-pixel or pixel modes. Sub-pixel dithering may be employed in conjunction with CFA mapping in either pixel or sub-pixel mode. In the pixel mode, each pixel of an input image may be mapped to 3 or 4 sub-pixels of a display device. In the sub-pixel mode, each pixel of an input image may be mapped to one sub-pixel of a display device. When the dithering module 334 is configured to operate at sub-pixel resolution, the quantization error of a particular color channel is diffused to same-colored sub-pixels of neighbor pixels. For example, the quantization error of a red sub-pixel of the input image is diffused to red sub-pixels of neighboring dithered pixels.

Figures 13, 14:
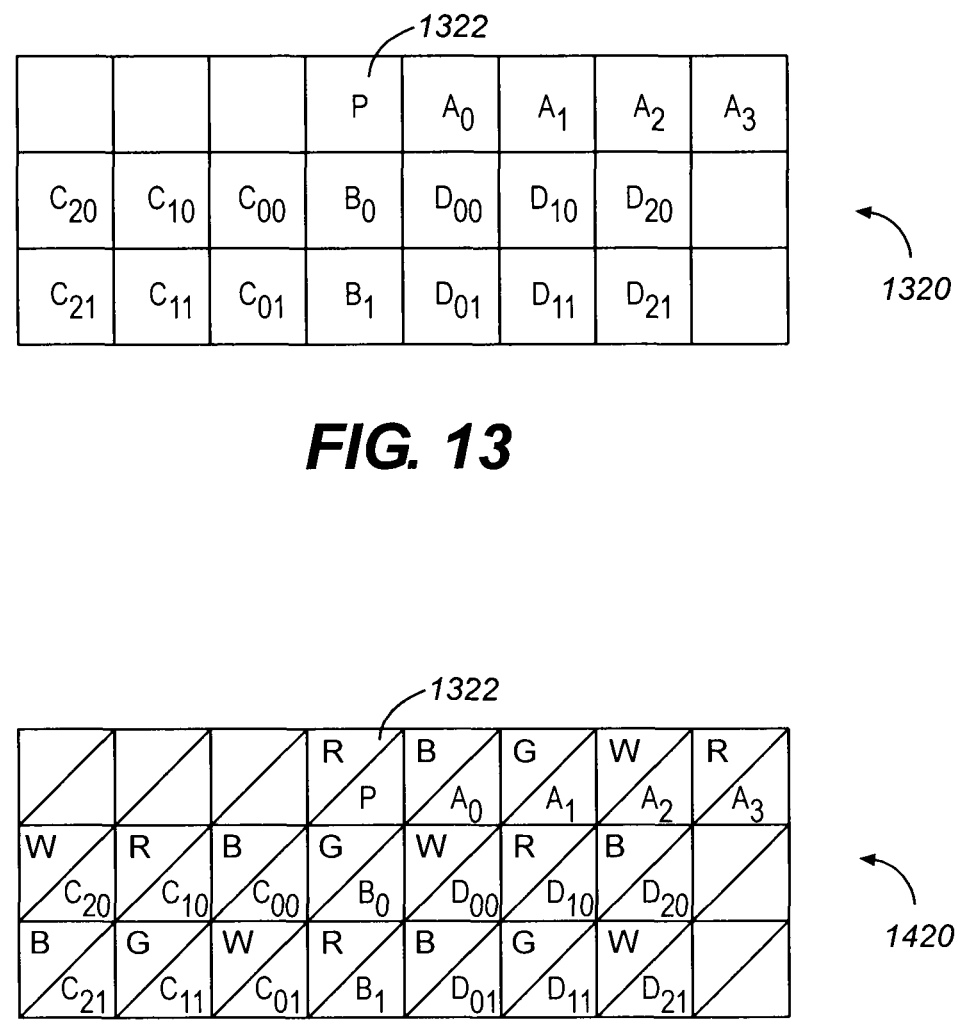

FIG. 13 illustrates a map 1320 for specifying which neighbor pixels or sub-pixels should receive a quantization error of a current sub-pixel "P." A current sub-pixel P is at location 1322. Possible neighbors on the same line and to the left of P in a display are designated "A." Possible neighbors on the next two lower lines directly below P in a display are designated "B." Possible neighbors on the next two lower lines, but in columns preceding P's column are designated "C." Possible neighbors on the next two lower lines, but in columns following P's column are designated "D." Referring to FIG. 6, locations $A_0$, $A_1$, $A_2$, and $A_3$ of FIG. 13 correspond with the location of neighbor pixel $P(i+1, j)$ of FIG. 6. Similarly, i.e., locations $B_0$, and $B_1$ correspond with the location of neighbor pixel $P(i, j+1)$, locations $C_{00}$, $C_{10}$, $C_{20}$, $C_{01}$, $C_{11}$, and $C_{21}$ correspond with the location of neighbor pixel $P(i-1, j+1)$, and locations $D_{00}$, $D_{10}$, $D_{20}$, $D_{01}$, $D_{11}$, and $D_{21}$ correspond with the location of neighbor pixel $P(i+1, j+1)$. Locations with subscripts of 0 or 00 are used to designate pixel locations. Locations with subscripts other than 0 or 00 are used to designate sub-pixel locations.

In a pixel mode of CFA mapping, quantization error may be diffused to adjacent pixels and a user may specify locations $A_0$, $B_0$, $C_{00}$, and $D_{00}$ of the map of FIG. 13.

In sub-pixel mode of CFA mapping, quantization error may be diffused to adjacent sub-pixels having the same color as the current sub-pixel. The particular mapping will depend on the particular CFA of the display device 124. FIG. 14 illustrates an example of specifying locations for diffusing quantization error to sub-pixels in sub-pixel mode CFA mapping mode. FIG. 14 assumes an exemplary CFA in which subpixels appear in the order R, B, G, W, and these sub-pixels are vertically adjacent to subpixels that appear in the order G, W, R, B. The assumed sub-pixel value according the CFA is shown in FIG. 14 above the diagonal line in each sub-pixel location. The current sub-pixel 1322 the shown in example is an R (red) sub-pixel. To diffuse the quantization error associated with the current sub-pixel R, the sub-pixel locations $A_3$, $B_1$, $C_{10}$, and $D_{10}$ may be selected, as each of these locations corresponds with a neighbor red sub-pixel. A user may select sub-pixel locations for a particular CFA by writing appropriate values to configuration and status registers 236. It will be appreciated that the maps 1320, 1420 may be used with other CFAs to designate which neighbor pixels or sub-pixels should receive a quantization error of a current pixel or sub-pixel.

Figure 15:
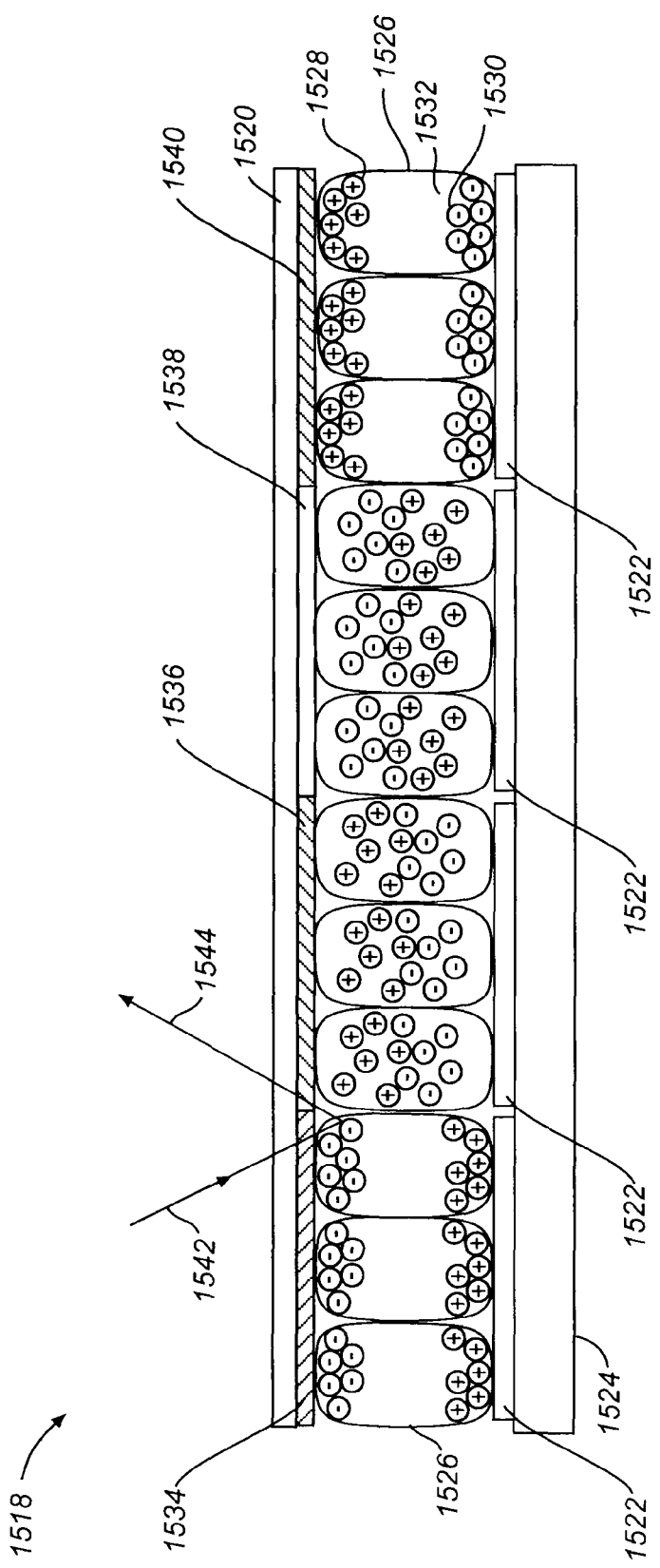
FIG. 15 is a simplified diagram of a cross-section of a portion of an exemplary electrophoretic display, depicting ambient light entering through a first color filter and exiting through an adjacent color filter.

FIG. 15 depicts a simplified cross-sectional representation of a portion of the exemplary electrophoretic display 1518. The display 1518 may include electrophoretic media sandwiched between a transparent common electrode 1520 and a plurality of sub-pixel electrodes 1522. The sub-pixel electrodes 1522 may reside on a substrate 1524. The electrophoretic media may include one or more (and typically, many) microcapsules 1526. Each microcapsule 1526 may include positively charged white particles 1528 and negatively charged black particles 1530 suspended in a fluid 1532. Alternatively, white particles may be negatively charged and black particles positively charged. In addition, it is not critical that the particles be only white and black; other colors may be used. In one embodiment, each sub-pixel may correspond with one sub-pixel electrode 1522, however, this is not required or critical. Each sub-pixel may correspond with one or more microcapsules 1526. In the exemplary display 1518, each sub-pixel pixel includes a filter disposed between the transparent common electrode 1520 and the microcapsules 1526 associated with the particular sub-pixel. In one embodiment, the filter 1534 may be a blue color filter, the filter 1536 may be a green color filter, the filter 1538 may be a white filter, and the filter 1540 may be a red color filter. The white filter 1538 may be a transparent structure; alternatively, a white filter may be omitted or absent from the location between the microcapsules 1526 associated with a particular sub-pixel and the common electrode 1520. In one alternative, the transparent common electrode 1520 may be disposed between sub-pixel pixel filters and the microcapsules 1526 associated with the particular sub-pixel. In addition, it is not required or critical that the color filters of display 1518 correspond with the RGBW color model. Any desired set of color filters may be used, e.g., RGB, CMY, RGBY, CMYB, or CMYK.

To change the display state of a sub-pixel, the common electrode 1520 may be placed at ground or some other suitable voltage, and a suitable voltage is placed on a sub-pixel electrode 1522. As a result, an electric field is established across the microcapsule(s) 1526 associated with the sub-pixel. When the electric field is positive, the white particles 1528 may move toward the common electrode 1520, which results in the display pixel becoming whiter or more reflective in appearance. On the other hand, when the electric field is negative, the black particles 1530 may move toward the common electrode 1520, which results in the display pixel becoming blacker or less reflective in appearance.

In FIG. 15, an incident ray 1542 of ambient light is reflected off one of the microcapsules 1526 associated with the blue display sub-pixel 1534. While the ray 1542 enters through blue color filter 1534, it exits through the green color filter 1536 associated with an adjacent sub-pixel. As a result, a reflected ray 1544 is influenced by both the blue and green color filters 1534 and 1536. As a consequence, the reflected ray 1544 may appear as cyan. Generally, this is not desirable. Scattered light reflections that exit through the color filters of adjacent sub-pixels may alter the color appearance of images on a display device in undesirable and unnatural appearing ways. Further, this side scattering problem may reduce the gamut of displayable colors. Moreover, this side scattering problem may become more pronounced when the display 1518 is viewed at an angle from one side or the other. Consequently, the side scattering problem may also reduce usable viewing angle.

Figure 16:
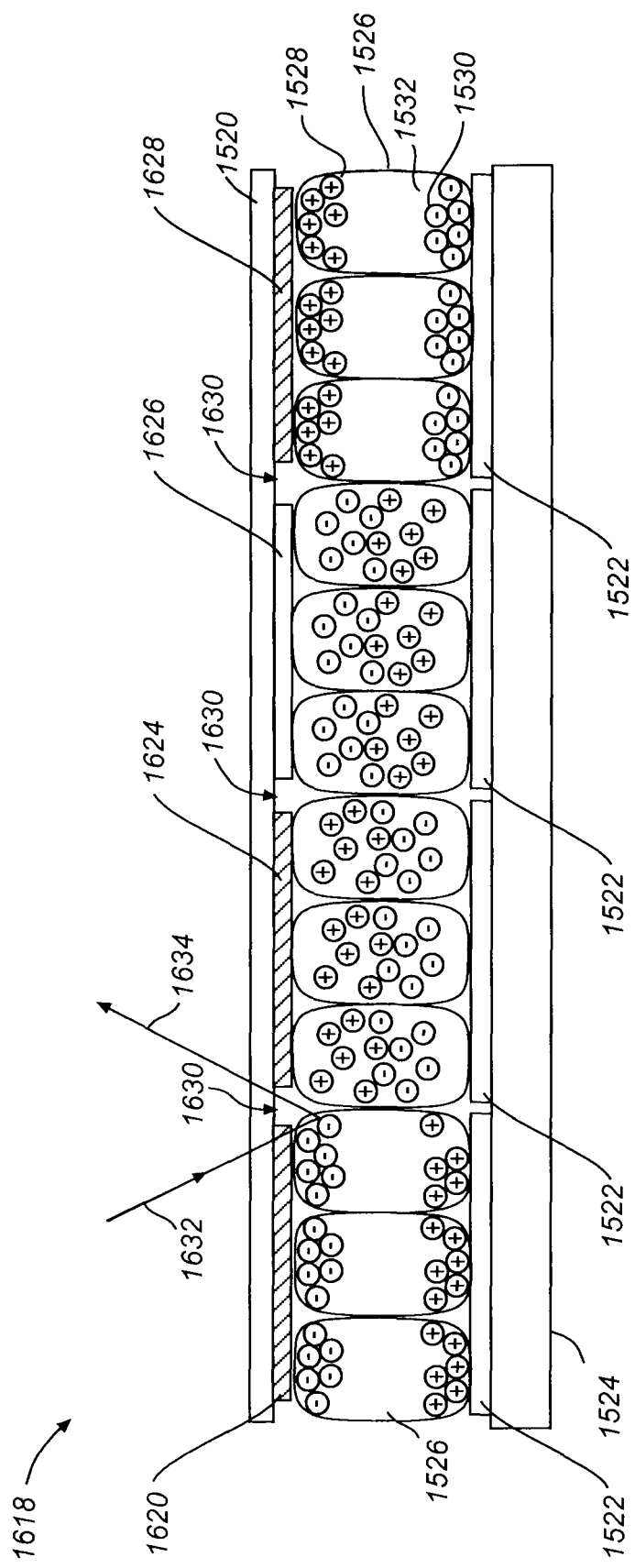
FIG. 16 is a simplified diagram of a cross-section of a portion of an exemplary electrophoretic display, depicting ambient light entering through a first color filter and exiting through a gap between adjacent color filters.

FIG. 16 illustrates one possible solution for the side scattering problem. FIG. 16 depicts a simplified cross-sectional representation of a portion of the exemplary electrophoretic display 1618. Parts of the display 1618 numbered the same as parts of display 1518 may be the same. The display 1618 includes a blue color filter 1620, a green color filter 1624, a white filter 1626, and a red color filter 1628. The color filters for the display 1618 differ from the color filters display 1518 in that they do not fully cover the microcapsules 1526 associated with a sub-pixel. Instead, there are gaps 1630 between adjacent color filters. The openings 1630 may be present on all four sides of a sub-pixel as viewed from the front, i.e., there may be a separation 1630 between a particular filter and the filters to either side in a row, and the filters in the rows above and below the particular filter. In FIG. 16, an incident ray 1632 of ambient light is reflected off one of the microcapsules 1526 associated with the blue display sub-pixel. While the ray 1632 enters through blue color filter 1620, reflected ray 1634 exits through the gap 1630 between the blue and green color filters 1620, 1624. Unlike the reflected ray 1544, the reflected ray 1634 is only influenced by the blue color filter 1620. The color of reflected ray 1634 will be influenced by the filter it passes through on the way to the microcapsule 1526 and the transparency of the gap 1630. However, the use of gaps 1630 separating color filters may reduce the saturation of colors rendered on the display.

Figure 17:
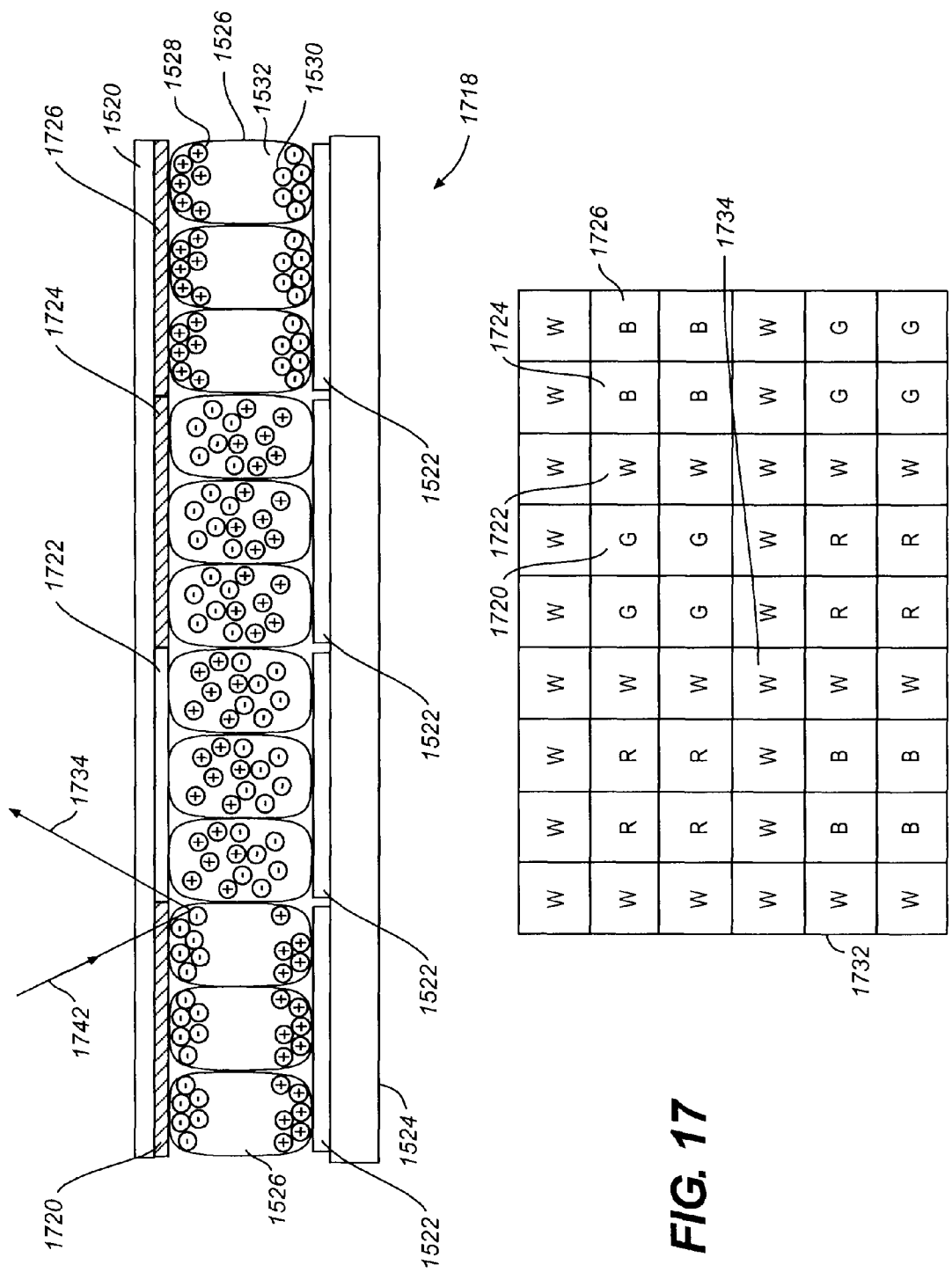
FIG. 17 is a simplified diagram of a cross-section of a portion of an exemplary electrophoretic display, and a front view of a color filter array according to one embodiment.

FIG. 17 illustrates an alternative solution to the side scattering problem, which may minimize or eliminate the reduction in color saturation that can occur when color filters are sized so that gaps or openings separate adjacent color filters. FIG. 17 depicts a simplified cross-sectional representation of a portion of the exemplary electrophoretic display 1718, according to one embodiment. Parts of the display 1718 numbered the same as parts of display 1518 may be the same. In one embodiment, the display 1718 includes a green color filter 1720, a white color filter 1722, blue color filters 1724 and 1726. In FIG. 17, an incident ray 1742 of ambient light is reflected off one of the microcapsules 1526 associated with the green display sub-pixel. While the ray 1742 enters through green color filter 1720, a reflected ray 1734 exits through the white color filter 1722 associated with an adjacent sub-pixel. The color of reflected ray 1730 will be influenced by the filter it passes through on the way to the microcapsule 1526, i.e., green filter 1720, and the transparency of the white color filter 1722. As a result, the reflected ray 1730 is not undesirably influenced by an adjacent red or blue color filter.

FIG. 17 also illustrates a front view of a CFA 1732, which corresponds with the display portion 1718. As shown in FIG. 17, the CFA 1732 may include four sub-pixel color filters of the same color surrounded by white sub-pixels. In one embodiment, the white sub-pixels of the CFA 1732 may be modulated to appear in varying states of reflectance. An advantage of the CFA 1732 is that white sub-pixels may be controlled or modulated to reflect more or less light to compensate for any reduction in saturation due to the inclusion of white pixels in the CFA.

In one embodiment, sub-pixels having color filters may be arranged in rows and columns in a repeating pattern, e.g., a Bayer pattern. In addition, each sub-pixel having a color filter may be horizontally adjacent or vertically adjacent to one or more white sub-pixels (or both horizontally adjacent and vertically adjacent). In this regard, a color filter for a colored sub-pixel, e.g., green, and a color filter for a white sub-pixel, e.g., transparent, may be horizontally or vertically adjacent one another. In one alternative, the color filter for the colored sub-pixel may horizontally or vertically contact or adjoin a white sub-pixel. In this context, vertical and horizontal refer to the front view of a CFA. For example, the green sub-pixel 1720 shown in the CFA 1732 of FIG. 17 is horizontally adjacent the white sub-pixel 1722. In addition, the green sub-pixel 1720 vertically contact or adjoins the white sub-pixel 1722.

The white sub-pixel 1722 shown in the CFA 1732 of FIG. 17 is not horizontally or vertically adjacent to a colored sub-pixel. Instead, the white sub-pixel 1722 diagonally adjacent to colored sub-pixels. In one embodiment, a diagonally adjacent sub-pixel need not be a white sub-pixel. In particular, even though the white sub-pixel 1722 is labeled in FIG. 17 as a white sub-pixel, it may be a red, green, or blue sub-pixel in this example. In one embodiment, the white sub-pixel 1722 may be a green sub-pixel.

With regard to the display 1718 and CFA 1732, it is not critical that the white color filters 1722 be white; they may be any desired color, e.g., yellow. The white filter 1722 may be a transparent structure; alternatively, a white filter may be omitted or absent from the location between the microcapsules 1526 associated with a particular sub-pixel and the common electrode 1520. In addition, while the CFA 1732 may be used with an RGBW color model. Any desired set of color filters may be substituted for the primary colors RGB, e.g., CMY.

Figure 18:
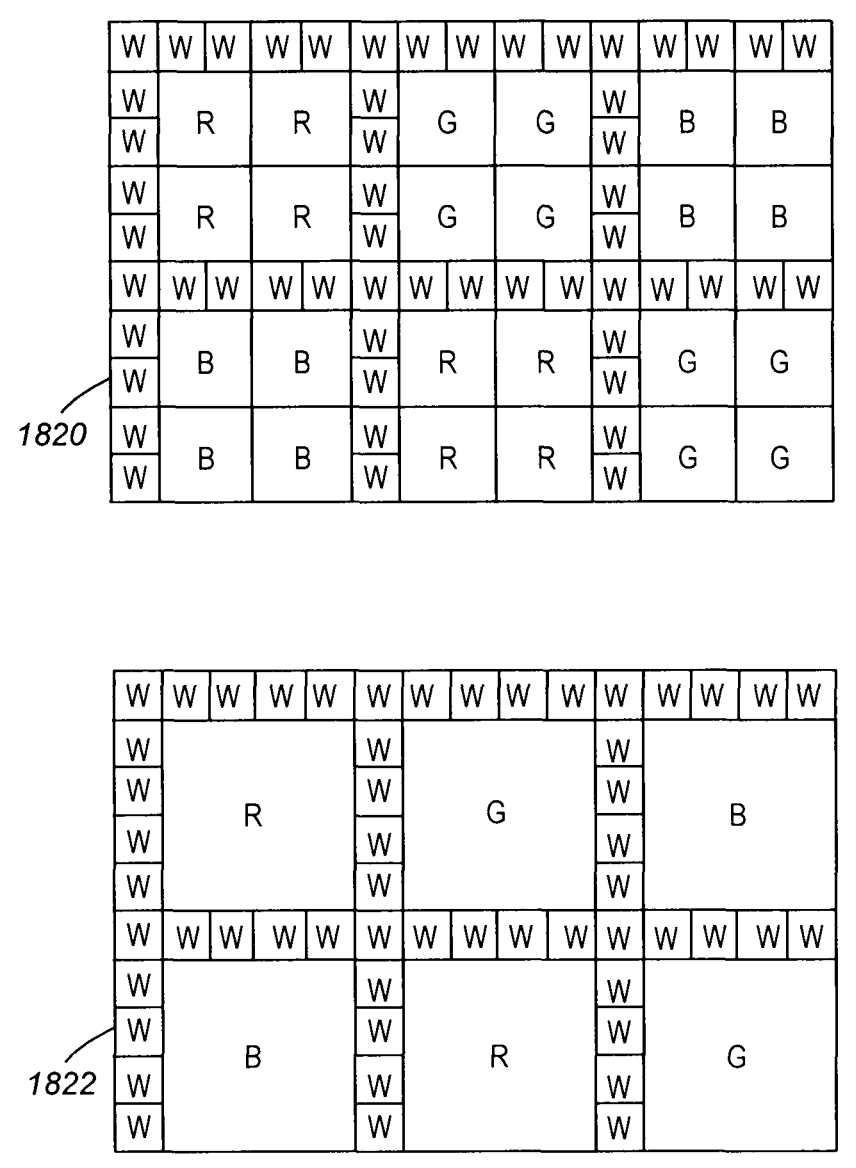
Figure 23:
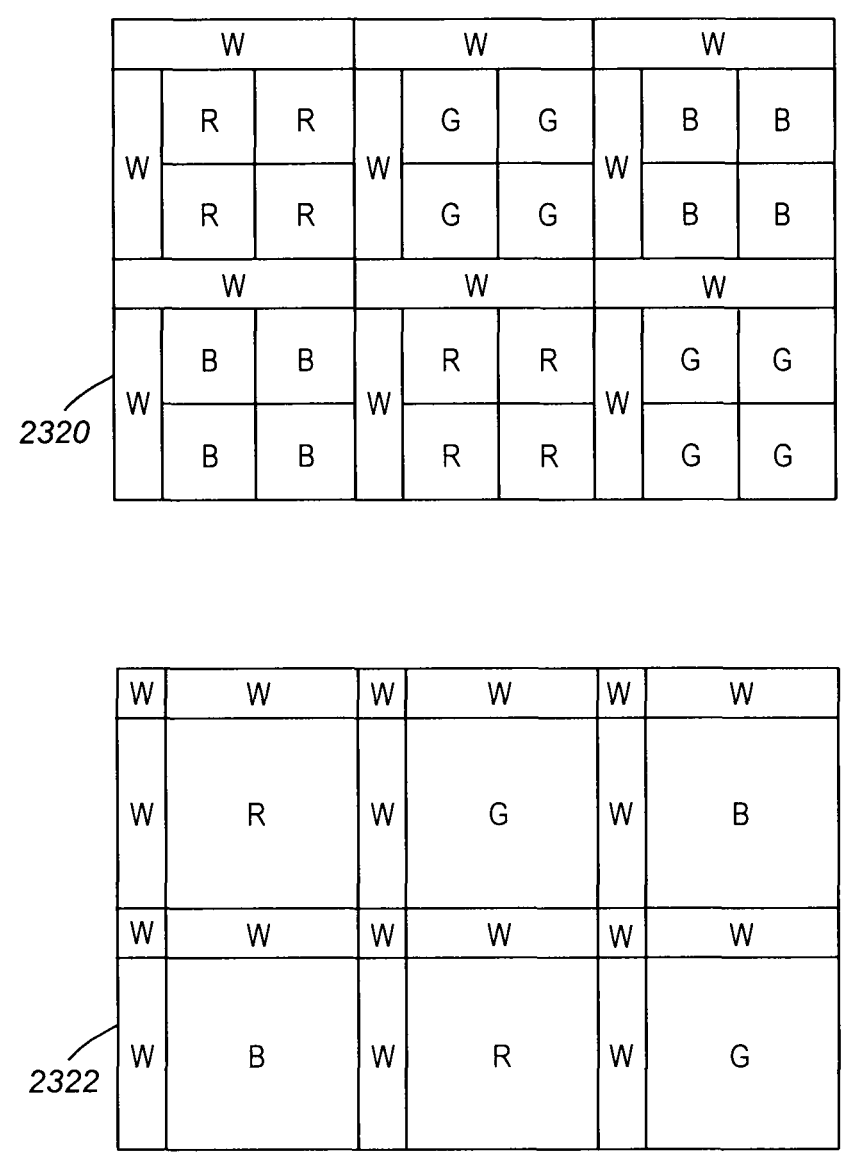

While the colored and white sub-pixels of the CFA 1732 are shown as being of the same size and shape, this is not critical. FIGS. 18 and 23 illustrate alternative embodiments of the CFA 1732. FIG. 18 shows a CFA 1820 in which the white sub-pixels are smaller than the colored sub-pixels. In this example, the white sub-pixels are half-as-tall and half-as-wide as the colored sub-pixels. In addition, FIG. 18 shows a CFA 1822 in which the colored sub-pixels are one-fourth-as-tall and one-fourth-as-wide as the colored sub-pixels. FIG. 23 illustrates a CFA 2320 and a CFA 2322. The CFAs 2320 and 2322 show that the white sub-pixels in a CFA may provided in two more sizes, and that the white sub-pixels in a CFA may differ in horizontal and vertical dimensions. In addition, the white sub-pixels in a CFA may differ dimensionally from the non-white sub-pixels.

It may be desirable to reduce the size of the color processor 152. This may be desirable, for example, where a color processor is implemented in an integrated circuit or other hardware. Reducing the size of a hardware-implemented color processor may correspond with a reduced number of logic gates as compared with the color processor 152.

Because the color processor 152 may be configured in many different ways, the color processor 152 may be used to evaluate many different color processing algorithms for EPDs. Empirical testing of the color processor 152 with a variety of color processing algorithms indicates that color processing algorithms suitable for color EPDs can still be implemented even though certain functions available in the color processor 152 are eliminated, or even though some of the options associated with a particular function are eliminated. In addition, empirical testing of the color processor 152 with a variety of color processing algorithms indicates that color processing algorithms suitable for color EPDs can still be implemented even though the order of performing color processing functions is restricted.

Figure 19:
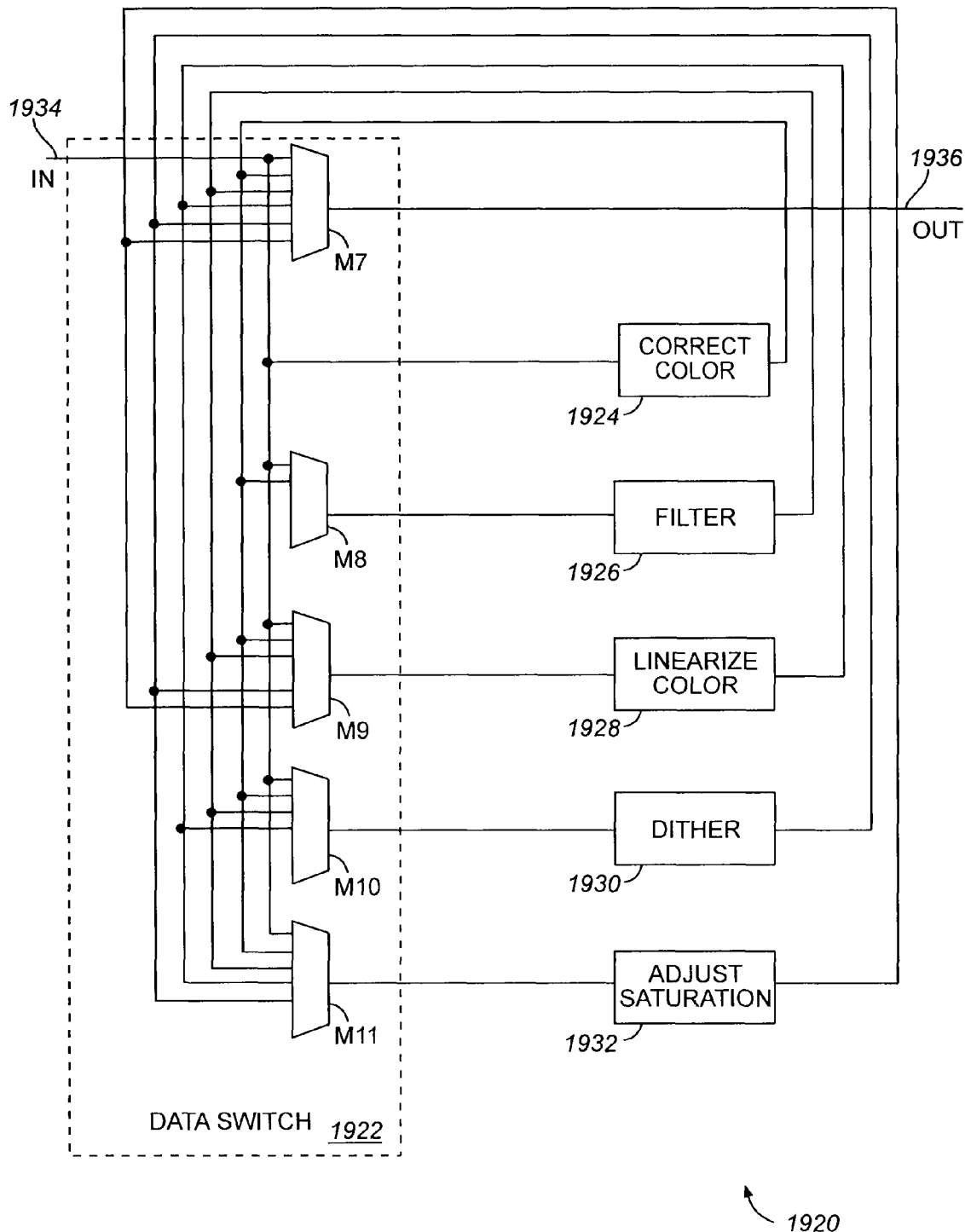
FIG. 19 illustrates a block diagram of a circuit for implementing the flexible data path for color synthesis of primaries according to one alternative embodiment.
Figure 20:
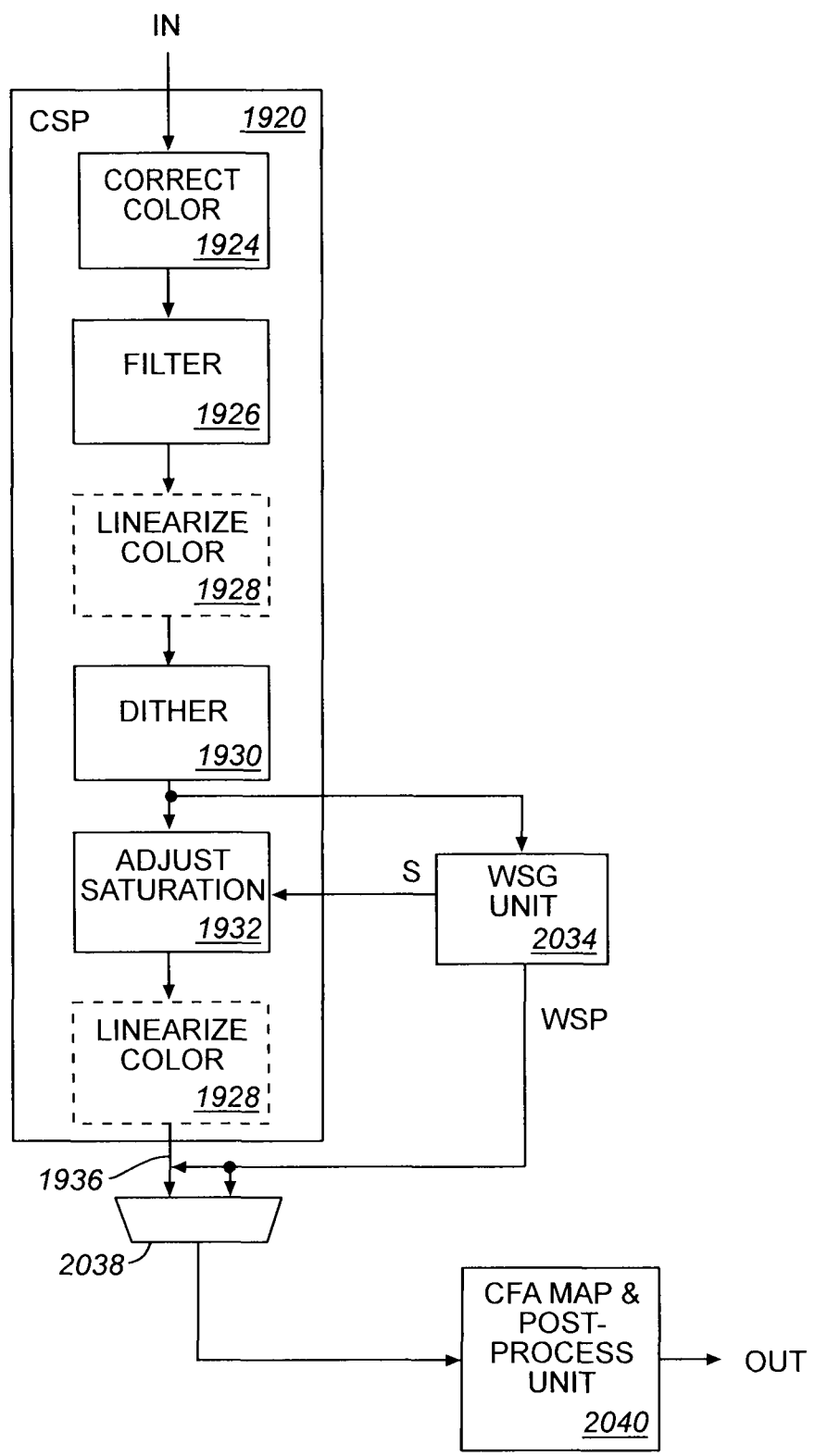
FIG. 20 is a simplified block diagram of a color processor, a white sub-pixel generation unit, and a post-processing unit according to one embodiment.

FIG. 19 illustrates a block diagram of a circuit 1920 for implementing the flexible data path 322 for color synthesis of primaries according to an alternative embodiment. The circuit 1920 employs a smaller number of logic gates than the circuit 420. The circuit 1920 may be included in the CSP unit 228 in one embodiment. The circuit 1920 may include, in one embodiment, a data switch 1922, a color correction module 1924, a filtering module 1926, a color linearization module 1928, a dithering module 1930, and a color saturation adjustment module 1932. The data switch 1922 includes an input 1934 for receiving image data and an output 1936 for outputting image data. The data switch 1922 includes multiplexers M7 to M11, each multiplexer including a select input (not shown). The data switch 1922 may be programmed or configured to include or exclude any particular processing module in a color processing algorithm using the select inputs. One advantage of the capability of exclude any particular processing module is that it permits separate analysis of each processing module apart from the effects of other processing modules. The order in which processing modules are used, however, is limited, as shown in FIG. 20. To reduce size of the CSP unit, the input color depth of the circuit 1920 is set at (5:6:5) rather than (8:8:8). In one embodiment, the input color depth of the circuit 1920 is RGB (5:6:5). Further, the circuit 1920 is limited to providing as output 12-bit pixel data in a 4:4:4 format.

A color processing algorithm that only operates on image data in its native resolution may be wasteful of power and processing time. On the other hand, use of a color processing algorithm to pro-processes a digital image at the bit-per-pixel resolution of the electro-optic display device may result in a rendered image having a sub-optimal appearance. The inventor has recognized that one reason that the appearance of the rendered image may be less than sub-optimal may be that performing the color processing algorithm at a higher degree precision than the electro-optic display is capable of rendering results in an improved selection of available display states or colors. For example, experiments by the inventor showed better color appearance of rendered images when a color processing algorithm performed its operations on 5:6:5 pixel data than when the same operations were performed on 4:4:4 pixel data. On the other hand, the color appearance of rendered images did not exhibit further improvement when the color processing algorithm performed its operations on 8:8:8 pixel data as compared with performing same operations using pixel data in the 5:6:5 resolution. In addition, as further described below, a color processing algorithm may include two or more operations and it may be desirable to perform certain of those operations at different pixel resolutions.

FIG. 20 is a simplified block diagram of a color processor including an alternative representation of the circuit of FIG. 19 according to one embodiment. The data switch 1922 (not shown in FIG. 20) may be programmed or configured so that any of the processing modules 1924, 1926, 1928, 1930, and 1932 may be included or excluded from a color processing algorithm. FIG. 20 illustrates that the order in which the shown processing modules are used is generally fixed, except that the color linearization module 1928 may be invoked either preceding the dithering module 1930 or following color saturation adjustment module 1932. As shown in FIG. 20, if all modules are used, the color correction module 1924 may only be used first, and the filtering module 1926 may only be used second. The color linearization module 1928 may be used after the filtering module 1926. If the color linearization module 1928 is used after filtering, the dithering module 1930 may only be used fourth. Otherwise, the dithering module 1930 may only be used third. The saturation adjustment module 1932 may only be used after the dithering module 1930. The saturation adjustment module 1932 may only be used last if the color linearization module 1928 is used following the filtering module 1926. If the color linearization module 1928 is not used following the filtering module 1926, the color linearization module 1928 is used last.

The CSP circuit 1920 reflects empirical testing with a variety of color processing algorithms for color EPDs. Testing indicated that if color correction is necessary, it is advantageous to perform this process first. Further, it was determined that it is not critical to include RGB to YCrCb conversion in the color correction module 1924. Accordingly, color correction module 1924 does not include this color space conversion capability. In one embodiment, the color correction module 1924 implements the following expression:

$$\begin{bmatrix} R' \\ G' \\ B' \end{bmatrix} = \begin{bmatrix} K_{11} & K_{12} & K_{13} \\ K_{21} & K_{22} & K_{23} \\ K_{31} & K_{32} & K_{33} \end{bmatrix} \times \begin{bmatrix} R_0 \\ G_0 \\ B_0 \end{bmatrix} + \begin{bmatrix} R_{outoff} \\ G_{outoff} \\ B_{outoff} \end{bmatrix}$$

In addition, the color correction module 1924 includes one or more predetermined sets of kernel coefficients and RGB offset values. Instead of selecting individual values for the color correction variables, a user may choose a predetermined setting. Examples of predetermined settings include (a) mild color enhance; (b) color enhance; (c) strong color enhance; (d) gray scale; (e) mild white warm; (f) mild daylight; and (g) mild illuminant. Alternatively, the user may choose to select individual values for the color correction variables. A user may select a predetermined setting or a custom setting by writing appropriate values to configuration and status registers 236.

Testing indicated that it is often desirable to include some type of filtering operation in a color processing algorithm. In addition, testing indicated that performing filtering after color correction and before color linearization produces good results. The filtering module 1926 is sized to process 5:6:5 pixel data. The filtering module 1926 includes one or more predetermined sets of filter coefficients. Instead of selecting individual values for the filter coefficients, a user may choose a predetermined setting. Examples of predetermined settings include: five levels of sharpening, plus (a) blur; (b) edge detect; (c) sketch; (d) sepia; (e) edge enhance; (f) emboss; (g) gray scale; and (h) bump mapping. Alternatively, the user may choose to select individual values for the filter coefficients. A user may select a predetermined setting or a custom setting by writing appropriate values to configuration and status registers 236.

Testing related to color linearization indicated that color linearization is commonly required. In one embodiment, the color linearization module 1928 may be the same as the color linearization module 328.

Testing revealed that an important pre-processing function is dithering. To reduce the effects of CSP functions on accuracy of dithering algorithm, the dithering module 1930 may be placed so that it is performed after the color correction and image sharpening functions. In one embodiment, the dithering module 1930 may be the same as the dithering module 334.

CFAs that include white sub-pixels have decreased color saturation in comparison with CFAs that omit white sub-pixels. Testing identified color saturation adjustment as an important function for inclusion in many color processing algorithms, especially those color processing algorithms for displays having CFAs that include white sub-pixels. Testing indicated that performing color saturation adjustment after performing a dithering operation produced visually pleasing results. The color saturation adjustment module 1932 implements the following equations:

$R'=S \times (R_0-Y)+Y$ $G'=S \times (G_0-Y)+Y$ $B'=S \times (B_0-Y)+Y$ where $Y=0.299R_0+0.587G_0+0.144B_0$ The portion of the color saturation adjustment module 1932 that determines R'G'B' uses only 3 multipliers and 6 adders. The portion of the color saturation adjustment module 85 that determines Y uses only 2 adders. Consequently, the color saturation adjustment module 1932 is smaller and more efficient that color saturation adjustment module 330.

Testing indicated that the luma scaling module 332 may be omitted without significantly reducing the flexibility of the CSP circuit 1920.

The circuit 1920 accepts 16-bit pixel data (5:6:5). Bit depth of an input image may be reduced to 16-bits by truncating the least significant bits of each sub-pixel. Alternatively, input pixels may have their bit depth reduced by rounding or using the floor function. For example:

$Y=\text{floor}(31 \times X \div 255)$ where X is the 8-bit data value of an input image sub-pixel and Y is the 5-bit value of the corresponding bit-depth reduced pixel.

Empirical testing with a variety of color processing algorithms for color EPDs sought to identify an appropriate level of calculation accuracy for each of the processing modules. Testing indicated that the color correction module 1924 and filtering module 1926 of the circuit 1920 may perform their respective operations at 16-bit pixel depth (5:6:5). Further, testing indicated that the color linearization module 1928 may accept as input 16-bit (5:6:5) pixel data and output 18-bit (6:6:6) pixel data, or alternatively, the color linearization module 1928 may accept as input 12-bit (4:4:4) pixel data and output 12-bit (4:4:4) pixel data. To handle both cases, the color linearization LUTs are of a size that accommodates 6-bits per pixel. In addition, testing indicated that the dithering module 1930 may accept as input 18-bit (6:6:6) pixel data (or 16-bit (5:6:5) pixel data) and output 12-bit (4:4:4) pixel data. Additionally, testing indicated that the color saturation adjustment module 1932 may accepts as input and outputs 12-bit (4:4:4) pixel data. The color saturation adjustment module 1932 may perform its calculations at 4-bits per sub-pixel.

Figure 21:
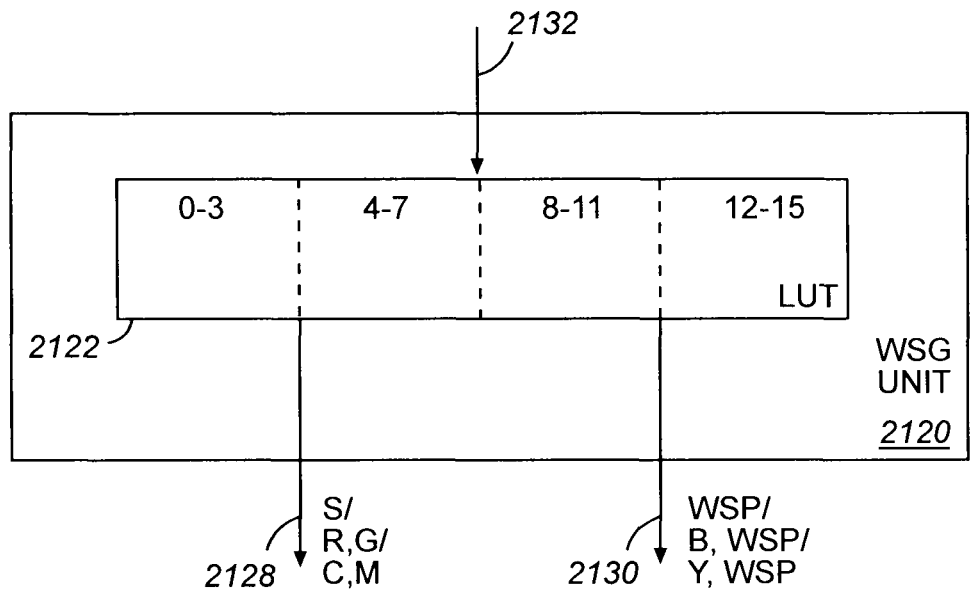
FIG. 21 is a simplified diagram of an exemplary white sub-pixel generation unit according to one embodiment.

FIG. 21 illustrates a block diagram of a WSG unit 2120 according to an alternative embodiment. The WSG unit 2120 employs a smaller number of logic gates than WSG unit 818. In addition, the WSG unit 2120 does not require latency FIFOs as the latency for S is constant and it is zero with respect to saturation adjustment module 1932. Further, the latency for WSP is either 1 or 2. Instead of requiring latency FIFOs, flip-flop delays (not shown) may be employed. The WSG unit 2120 reflects empirical testing with a variety of color processing algorithms for color EPDs. The WSG unit 2120 includes LUT memory 2122, which may be 16-bits wide.

Figure 22:
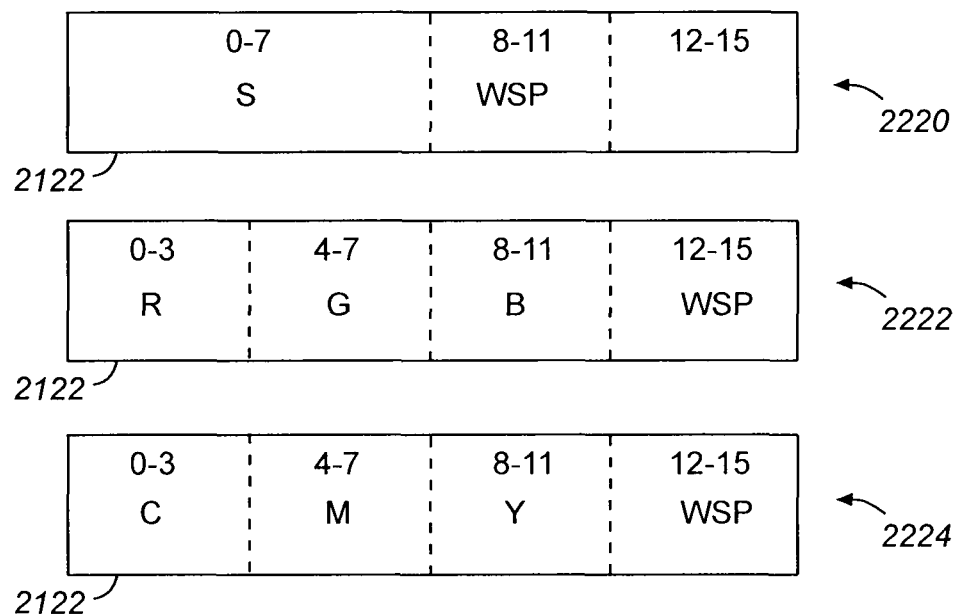
FIG. 22 illustrates exemplary, alternative configurations for use of a look up table memory of the FIG. 21.

The LUT 2122 may be used to implement two or more configurations. FIG. 22 illustrates three possible configurations in which the LUT 2122 may be used. In a first configuration 2220, bits 0-7 of LUT 2122 may be used to store values of saturation factor S, and bits 8-11 may be used to store values of fourth pixel "WSP." In a second configuration 2222, bits 0-3 of LUT 2122 may be used to store R values, bits 4-7 may be used to store G values, bits 8-11 may be used to store B values, and bits 12-15 may be used to store values of fourth pixel WSP. In a third configuration 2224, bits 0-3 of LUT 2122 may be used to store C values, bits 4-7 may be used to store M values, bits 8-11 may be used to store Y values, and bits 12-15 may be used to store values of fourth pixel WSP. Accordingly, the output 2128 may output 8-bit S values, the R and G values of a 4:4:4:4 RGBW pixel, or the C and M values of a 4:4:4:4 CMYW pixel. In addition, the output 2130 may output 4-bit fourth pixel values that may be combined with RGB values. Alternatively, the output 2130 may output the Y and W values of a CMYW pixel. The second configuration 2222 and third configuration 2224 show that the WSG unit 2120 enables one-to-one mapping of input and output pixel values. A user may store desired values in the LUT 2122.

Accordingly, it should be appreciated that the concepts disclosed in this specification can be used to develop and modify color processing algorithms for existing and future-developed color EPDs in a flexible manner. In many cases, the most desirable color processing algorithm for a particular EPD will depend on ambient lighting conditions and the type of image being rendered. The determination of a color processing algorithm for a particular EPD is a complex process involving many variables. If an assumption is made that the EPD will be viewed in bright light, less upward adjustment of luma and saturation will likely be called for than in cases where it is assumed that the EPD will be viewed in relatively dim light. Similarly, different luma and saturation adjustments may be deemed optimum for viewing black and white text as compared with those desired for color photographs of human faces or natural landscapes.

In one embodiment, parameters for programming or configuring first, second, third, and fourth color processing algorithms may be stored in either system memory 130 or display controller memory 150. For example, the first color processing algorithm may be determined to be optimum for viewing a particular EPD rendering a text image in bright, natural ambient lighting conditions, e.g., sunlight. The second color processing algorithm may be determined to be optimum for viewing the particular EPD rendering a photographic image of a human face in bright, natural ambient lighting conditions. The third color processing algorithm may be determined to be optimum for viewing the particular EPD rendering the text image in low, artificial ambient lighting conditions, e.g., a tungsten light source in a darkened room. The third color processing algorithm may boost luma and saturation as compared with the first color processing algorithm. The fourth color processing algorithm may be determined to be optimum for viewing the particular EPD rendering the photographic image of a human face in low, artificial ambient lighting conditions. The fourth color processing algorithm may boost luma and saturation in a manner similar to the third algorithm and may additionally adjust color to correct for color distortion caused by the tungsten light source.

The storing of two or more color processing algorithms in a memory allows selection and used of a color processing algorithm best suited for viewing conditions and image type. The determination of current viewing conditions may be made explicitly by an end user of the display system, or automatically through the use of the image sensor 118. The end user may select a current viewing condition by choosing one of two or more predetermined options from a menu, e.g., sunlight, overcast outdoor light, bright indoor light, bright indoor light, tungsten light, fluorescent light, etc. The image sensor 118 may determine both the ambient light level and the spectral components of the ambient light source.

Similarly, the determination of image type may be made explicitly by an end user of the display system, or automatically. The end user may select a current viewing condition by choosing one of two or more predetermined options from a menu, e.g., black and white text, black and white text including fewer than five highly saturated colors, color photograph of human face, color photograph of landscape, cartoon, etc. The determination of image type may be performed automatically by pre-coding the image file with image type, or by use of one or more known automatic image analysis techniques.

As one example of an automatic image analysis technique, software or hardware may be used to prepare a color histogram of an image. Using the histogram, mages may be categorized by color content. For example, a text image may be recognized as having characteristic color content. As another example, a facial image may be recognized as having one or more characteristic color contents. Once the foregoing determinations have been made, the most suitable color processing algorithm for the determined viewing conditions and image type may be retrieved from memory and used to program or configure the display system. When viewing conditions and image type change, the display system may be reconfigured, either automatically or explicitly by the user, to use a more suitable algorithm.

In one embodiment, parameters for configuring multiple color processing algorithms may be stored in a memory, and the image to be rendered on a display device includes two or more images. For example, the image to be rendered includes a text image and a color photograph. The storing of two or more color processing algorithms in a memory allows selection and use of a color processing algorithm suited for the type of sub-image. Where there are two image types to be rendered simultaneously, a different color processing algorithm may be selected for each sub-image. Selection of a suitable color processing algorithm for each sub-image may be automatic using a known automatic image analysis technique, or may be explicitly made by an end user.

While the concepts disclosed in this specification have been described in terms of a display system having a display controller and a display device, it should be appreciated that the disclosed embodiments are exemplary. The disclosed concepts may be used with other types of display device, including reflective and self-illuminating types. Moreover, the disclosed concepts may be used in any application, e.g., printing or projecting an image, where it is desired to modify the color characteristics of a digital image.

In one embodiment, some or all of the operations and methods described in this description may be performed by hardware, software, or by a combination of hardware and software.

In one embodiment, some or all of the operations and methods described in this description may be performed by executing instructions that are stored in or on a non-transitory computer-readable medium. The term "computer-readable medium" may include, but is not limited to, non-volatile memories, such as EPROMs, EEPROMs, ROMs, floppy disks, hard disks, flash memory, and optical media such as CD-ROMs and DVDs. The instructions may be executed by any suitable apparatus, e.g., the host 122 or the display controller 128. When the instructions are executed, the apparatus performs physical machine operations.

In this description, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

The invention claimed is:

1. A method for preparing a color image for display on an electro-optic display device, comprising:
   (a) receiving the color image defined by data pixels in a first pixel resolution, the first pixel resolution corresponding with each data pixel having a 5-bit red component, a 6-bit green component, and a 5-bit blue component;
   (b) performing a color correcting operation on the color image in the first pixel resolution;
   (c) performing an image sharpening operation on the color image in the first pixel resolution;
   (d) performing a color linearization operation on the color image in the first pixel resolution;
   (e) performing an image dithering operation on the color image in the first pixel resolution, the image dithering operation outputting the color image in a second pixel resolution, the second pixel resolution corresponding with each data pixel having a 4-bit red component, a 4-bit green component, and a 4-bit blue component; and
   (f) performing a saturation adjustment operation on the color image in one of the first and second pixel resolutions;
   wherein the display device includes a display matrix of display pixels, each display pixel comprising:
      two or more first sub-pixels, each first sub-pixel having two or more display states and a color filter; and
      a second sub-pixel, each second sub-pixel having two or more display states and a white filter, wherein
      the first sub-pixels are arranged in rows and columns in a repeating pattern, and
      each first sub-pixel is horizontally adjacent and vertically adjacent to one or more second sub-pixels.

2. The method of claim 1, wherein the operations (b), (c), (d), (e), and (f) are performed in the order: (b), (c), (d), (e), (f).

3. The method of claim 1, wherein the operations (b), (c), (d), (e), and (f) are performed in the order: (b), (c), (e), (f), (d).

4. The method of claim 1, wherein one or more of the operations (b), (c), (d), (e), and (f) is not performed.

5. A display controller, comprising:
   a data switch having an input to receive a color image defined by data pixels in a first pixel resolution, the first pixel resolution corresponding with each data pixel having a 5-bit red component, a 6-bit green component, and a 5-bit blue component;
   a color correction module to perform a color correcting operation on the color image in the first pixel resolution;
   an image filtering module to perform an image sharpening operation on the color image in the first pixel resolution;
   a color linearization module to perform a color linearization operation on the color image in the first pixel resolution;
   an image dithering module to perform an image dithering operation on the color image in the first pixel resolution, the image dithering operation outputting the color image in a second pixel resolution, the second pixel resolution corresponding with each data pixel having a 4-bit red component, a 4-bit green component, and a 4-bit blue component; and
   a saturation adjustment module to perform a saturation adjustment operation on the color image in one of the first and second pixel resolutions.

6. The display controller of claim 5, further comprising a display engine to output waveforms to an electro-optic display device, the display device having a display matrix of display pixels, each display pixel comprising:
   two or more first sub-pixels, each first sub-pixel having two or more display states and a color filter; and
   a second sub-pixel, each second sub-pixel having two or more display states and a white filter, wherein
   the first sub-pixels are arranged in rows and columns in a repeating pattern, and
   each first sub-pixel is horizontally adjacent and vertically adjacent to one or more second sub-pixels.

7. The display controller of claim 5, wherein the display device is an electrophoretic display device.

* * * * *